(12) United States Patent
Fujita

(10) Patent No.: US 8,346,668 B2
(45) Date of Patent: Jan. 1, 2013

(54) ELECTRONIC MONEY SYSTEM AND ELECTRONIC MONEY TRANSACTION METHOD

(75) Inventor: Naotake Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 507 days.

(21) Appl. No.: 12/594,708

(22) PCT Filed: Apr. 4, 2008

(86) PCT No.: PCT/JP2008/126805
§ 371 (c)(1),
(2), (4) Date: Oct. 23, 2009

(87) PCT Pub. No.: WO2008/126805
PCT Pub. Date: Oct. 23, 2008

(65) Prior Publication Data
US 2010/0217710 A1    Aug. 26, 2010

(30) Foreign Application Priority Data
Apr. 6, 2007  (JP) ................................. 2007-101036

(51) Int. Cl.
*G06Q 20/00* (2012.01)
(52) U.S. Cl. ............. 705/67; 705/76; 705/26.1; 705/39; 705/44
(58) Field of Classification Search ..................... 705/67
See application file for complete search history.

(56) References Cited

U.S. PATENT DOCUMENTS

| | | | | |
|---|---|---|---|---|
| 5,623,547 A * | 4/1997 | Jones et al. | ...................... | 705/68 |
| 5,850,446 A * | 12/1998 | Berger et al. | ................... | 705/79 |
| 5,905,976 A * | 5/1999 | Mjolsnes et al. | ................ | 705/39 |
| 5,943,423 A * | 8/1999 | Muftic | ............................ | 705/67 |
| 6,014,646 A * | 1/2000 | Vallee et al. | ..................... | 705/39 |
| 6,081,790 A | 6/2000 | Rosen | | |
| 6,178,406 B1 * | 1/2001 | Cheetham et al. | ........... | 705/7.34 |
| 6,470,448 B1 * | 10/2002 | Kuroda et al. | ................ | 713/176 |
| 6,947,910 B2 | 9/2005 | Hsu et al. | | |
| 7,143,066 B2 * | 11/2006 | Shear et al. | ..................... | 705/54 |

(Continued)

FOREIGN PATENT DOCUMENTS

EP    0518365 A2 * 12/1992

(Continued)

OTHER PUBLICATIONS

Chaum, D., "Blind Signatures for Untraceable Payments", All pages, 1998. http://blog.koehntopp.de/uploads/Chaum.BlindSigForPayment.1982.PDF.*

(Continued)

*Primary Examiner* — James A Reagan
*Assistant Examiner* — Calvin Cheung

(57) ABSTRACT

An electronic money system is directed to avoid unauthorized use of certificate-type electronic money. The electronic money system is provided with a management server, a verification sever, a remittance terminal, and a receptor terminal. In response to a request from the remittance terminal, the management server issues an inactive electronic certificate including a certificate ID and notifies the verification server of the certificate ID. The remittance terminal gives a group signature to the inactive electronic certificate to generate an active electronic certificate. The reception terminal verifies the active electronic certificate obtained from the remittance terminal on the basis of the group signature. The verification server matches the certificate ID notified from the management server with the certificate ID included in the active electronic certificate verified by the reception terminal to verify availability of the active electronic certificate.

25 Claims, 19 Drawing Sheets

U.S. PATENT DOCUMENTS

| | | | |
|---|---|---|---|
| 7,181,017 B1* | 2/2007 | Nagel et al. | 380/282 |
| 7,520,430 B1* | 4/2009 | Stewart et al. | 235/383 |
| 7,568,234 B2 | 7/2009 | Naslund et al. | |
| 8,185,473 B2* | 5/2012 | Ginter et al. | 705/52 |
| 2002/0026418 A1* | 2/2002 | Koppel et al. | 705/41 |
| 2002/0029337 A1* | 3/2002 | Sudia et al. | 713/176 |
| 2002/0073311 A1* | 6/2002 | Futamura et al. | 713/157 |
| 2002/0143655 A1* | 10/2002 | Elston et al. | 705/26 |
| 2003/0069904 A1 | 4/2003 | Hsu et al. | |
| 2003/0120554 A1* | 6/2003 | Hogan et al. | 705/26 |
| 2004/0034774 A1 | 2/2004 | Le Saint | |
| 2004/0111375 A1* | 6/2004 | Johnson | 705/64 |
| 2004/0111379 A1* | 6/2004 | Hicks et al. | 705/76 |
| 2005/0005125 A1* | 1/2005 | Zhang et al. | 713/176 |
| 2005/0021969 A1* | 1/2005 | Williams et al. | 713/176 |
| 2005/0085931 A1* | 4/2005 | Willeby | 700/89 |
| 2005/0154877 A1* | 7/2005 | Trench | 713/156 |
| 2005/0171904 A1* | 8/2005 | Yacobi et al. | 705/40 |
| 2005/0278787 A1 | 12/2005 | Naslund et al. | |
| 2006/0248353 A1* | 11/2006 | Shear et al. | 713/194 |
| 2007/0011100 A1* | 1/2007 | Libin et al. | 705/65 |
| 2007/0088950 A1* | 4/2007 | Wheeler et al. | 713/170 |
| 2007/0136197 A1* | 6/2007 | Morris | 705/44 |
| 2007/0150419 A1* | 6/2007 | Kozlay | 705/67 |
| 2007/0179883 A1* | 8/2007 | Questembert | 705/39 |
| 2007/0214356 A1* | 9/2007 | Song et al. | 713/156 |
| 2007/0226365 A1 | 9/2007 | Hildreth et al. | |
| 2008/0052091 A1* | 2/2008 | Vawter | 705/1 |
| 2008/0091596 A1* | 4/2008 | Labaton | 705/40 |
| 2008/0141035 A1* | 6/2008 | Furukawa | 713/180 |
| 2008/0183629 A1* | 7/2008 | Kausik | 705/67 |
| 2008/0189272 A1* | 8/2008 | Powers et al. | 707/5 |
| 2008/0223918 A1* | 9/2008 | Williams et al. | 235/379 |
| 2008/0301056 A1* | 12/2008 | Weller et al. | 705/67 |
| 2009/0031137 A1* | 1/2009 | Ishizaka et al. | 713/180 |
| 2009/0125429 A1* | 5/2009 | Takayama | 705/35 |
| 2009/0228395 A1 | 9/2009 | Wegner et al. | |
| 2010/0153273 A1* | 6/2010 | Sellars et al. | 705/67 |
| 2010/0191652 A1* | 7/2010 | Eckert et al. | 705/67 |
| 2011/0119180 A1* | 5/2011 | Park et al. | 705/40 |
| 2011/0185170 A1* | 7/2011 | Sudhakar | 713/155 |
| 2012/0028609 A1* | 2/2012 | Hruska | 455/411 |

FOREIGN PATENT DOCUMENTS

| | | | |
|---|---|---|---|
| EP | 0755136 A2 * | 1/1997 | |
| EP | 1206066 A2 * | 5/2002 | |
| JP | 9-128465 A | 5/1997 | |
| JP | 11-31204 A | 2/1999 | |
| JP | 200036005 A | 11/2000 | |
| JP | 2001084311 A | 3/2001 | |
| JP | 2002508552 A | 3/2002 | |
| JP | 2003066836 A | 3/2003 | |
| JP | 2003150875 A | 5/2003 | |
| JP | 2003256887 A | 9/2003 | |
| JP | 2004015507 A | 1/2004 | |
| JP | 2004103013 A | 4/2004 | |
| JP | 2004280851 A | 10/2004 | |
| JP | 2004288033 A | 10/2004 | |
| JP | 2005011239 A | 1/2005 | |
| JP | 2005513956 A | 5/2005 | |
| JP | 2005525721 A | 8/2005 | |
| JP | 2005242543 A | 9/2005 | |
| JP | 2005310007 A | 11/2005 | |
| JP | 2005327113 A | 11/2005 | |
| JP | 2006166117 A | 6/2006 | |
| JP | 2007087020 A | 4/2007 | |
| WO | 2006137250 A | 12/2006 | |

OTHER PUBLICATIONS

Stadler et. al., "Fair Blind Signatures", all pages, 1995. http://www.ubilab.org/publications/print_versions/pdf/sta95.pdf.*

Watanabe et. al., "Account Management Method with Blind Signature Scheme", all pages, date unknown. http://www.waset.org/journals/waset/v59/v59-387.pdf.*

Tahat et. al., "A New Partially Blind Signature Based on Factoring and Discrete Logarithms", Journal of Mathematics and Statistics, all pages, 2008.*

I. Teranishi et al, "k-Times Anonymous Authentication (Extended Abstract)", ASIACRYPT 2004, LNCS 3329, pp. 308-322, 2004.

International Search Report for PCT/JP2008/126805 mailed Jun. 3, 2008.

G. Ateniese et al, "A Practical and Provably Secure Coalition-Resistant Group Signature Scheme", In Advances in Cryptology CRYPTO 2000, LNCS 1880, p. 255-270. Springer—Verlag, 2000.

US Office Action for U.S. Appl. No. 12/593,437 mailed on May 25, 2012.

Japanese Office Action for JP2007-101036 mailed on Jul. 3, 2012.

* cited by examiner

ELECTRONIC MONEY SYSTEM AND ELECTRONIC MONEY TRANSACTION METHOD

The present application is the National Phase of PCT/JP2008/056808, filed Apr. 4, 2008, which claims the benefit of the priority based on Japanese Patent Application No. 2007-101036 and the disclosure of which is incorporated herein by reference.

TECHNICAL FIELD

Background Art

In these years, an electronic commercial transaction using electronic money is activated. The electronic money is electronic information that serves as a currency or a certificate used as value of a service or a commodity in a commercial transaction.

Here, the currency is equivalent to, for example, cash, gift certificates, points issued by a company, and the like. The certificate is equivalent to a check and the like whose values change depending on an allocated money amount.

An issuer of the electronic money (for example, a bank) provides a function as the electronic money to the electronic information by giving an electronic signature. In this case, a user of the electronic money can confirm whether the obtained electronic money is regular money or not by verifying the electronic signature sent from the issuer of the electronic money.

An open-loop type and a closed-loop type are there as types of the electronic money, and in accordance with an increase of an individual electronic commercial transaction, it is increasingly demanded to develop open-loop type electronic money that can be treated in a same manner as that of bills.

Similar to the bills, the electric money has to be used in line with prohibition of counterfeit, prohibition of forging, anonymous transaction, and the like as a principle. The anonymous transaction is a transaction to remit and receive the electronic money in a state where information of the remittance side (for example, a service user) is not known by the reception side (for example, a service provider). In a related technique, the anonymity is provided to the electronic money by giving a blind signature.

The blind signature is a technique for allowing a signature client to get a signature in a state where contents of data is not known by a signer. The electronic money using the blind signature will be explained below.

The issuer of the electronic money receives target data of sign including an identification number of random digits and a requested amount from the client, reduce a requested amount from an account of the client, and carries out the electronic signature to the target data of sign.

At this time, the issuer signs without looking contents of the target data of sign. The client receives the signed target data of sign from the issuer, and uses this signed target data of sign as the electronic money. In a case where such electronic money is used to be paid to the service provider, the service provider uses the received electronic money (the signed target data of sign) after verifying the money with a public key.

In addition, the electronic money used as a certificate is prohibited to be twice used. Thus, a verification center checks whether or not the electronic money issued as a certificate is twice used, thereby preventing an unauthorized remittance. Specifically, the remittance side designates an amount of the electronic money issued as a certificate and passes the electronic money to the reception side. Here, the reception side lets the verification center (for example, the bank of issuer) verify the electronic money. The verification center checks (verifies) whether or not the electronic money is twice used. In a case of being acceptable in the verification of the verification, the issuer deposits the money amount designated in the electronic money into an account of the reception side. In addition, in a case of being unacceptable in the verification of the verification center, the issuer refuses the deposit.

As described above, in the case of employing the blind signature, the issuer (the verification center) and the service provider are not able to know the identification number of the electronic money. For this reason, even if the service provider asks the verification center to verify the twice use of the electronic money, the use state cannot be confirmed by using the issued identification number.

Consequently, in the case of employing the blind signature, the verification center prepares a database for registering used electronic money, and confirms a use state of the electronic money by using this database. In a case where the electronic money sent from the service provider has been already registered in the database, the verification center determines it as the unauthorized remittance (the twice use). In addition, in a case where the electronic money has not been registered, the verification center determines the electronic money to be acceptable and deposits the money amount designated in the electronic money into the account of the service provider.

In this manner, the electronic money able to keep the information related to the client secret is realized by employing a blind signature technique. On this occasion, when the used electronic money is registered, the twice use by an electronic money user can be prevented.

Moreover, as a related technique, there is a technique where a user sends to an issuer (a verification center) electronic money including own identification number so as not to be normally revealed and thus confirms a use state of the electronic money. Accordingly, in a case of detecting an unauthorized use, the issuer (the verification center) is able to specify a user of the authorized use by knowing this identification information in some methods.

However, in the electronic money according to such related technique, all of the used electronic money have to be registered in order to detect an unauthorized use of the electronic money. For this reason, the more use of the electronic money becomes common, the more information amount of the used electronic money registered into the database increases, resulting in being impractical.

In addition, in the related technique, when electronic money obtained in illegal methods, for example, the copy and the like is used (settled) in a period when a regular user has not completed the use (the settlement), namely, a period when the electronic money has not been registered as the used money, there is a possibility that the issuer (the verifier) deposits the electronic money into an count of the illegal user. In this case, the electronic money of the regular user can not be settled. Since there is a possibility that the illegal user escapes, the used electronic money sometimes cannot be refunded even when the illegal user has been specified on the basis of the identification information notified at the settlement.

Furthermore, in the related technique, the remitter of the electronic money remits the electronic money by using an anonymous ID. In this case, when the number of the remittances is large, the anonymity of the remitter to the recipient tends to be easily lost because of the linkability. For example, when once the remitter completes a user registration at the remittance and the personal information is leaked on the basis of the contents of the user registration, all subsequent remittance histories are in danger of being linked to the personal information to be leaked to the recipient.

As a related technique regarding the electric money using the blind signature, Japanese Laid Open Patent Application No. H9-128465, for example, is known. In an electronic cash method disclosed in Japanese Laid Open Patent Application No. H9-128465, a trust agency secretly manages a correspondence table between an electronic money user and published information, and issues a signed license of use to the user. A bank provides the blind signature on the license of use, and issues the license as an electronic bill (the electronic money) to the user. When using the electronic money at a retail store, the user designates a money amount in the electronic money. At the settlement of the electronic money, the retail store sends update history information with the user to the bank and receives the money amount designated in the electronic money.

Meanwhile, as a signature method where the personal information of a signer is kept secret, there is a group signature. A service provider verifying a signature in accordance with the group signature is able to verity the signature without specifying the signer. As a cryptographic technique for the group signature, Japanese Translation of PCT No. 2005-513956 and Japanese Translation of PCT No. 2005-525721, for example, are there.

DISCLOSURE OF INVENTION

The present invention proposes a method for preventing an illegal use and an improper use of certificate-type electronic money, ensuring unlinkability in use of the electronic money, and enabling the illegally-used electronic money to be traced.

An electronic money system of the present invention includes: a management server; a verification server; a remittance terminal; and a reception terminal that are connected each other via a network. In response to a request for the remittance terminal, the management server issues an inactive electronic certificate including a certificate ID, and notifies the verification server of the certificate ID. The remittance terminal gives a group signature to the inactive electronic certificate and generates an active electronic certificate. The remittance terminal is preliminarily registered in a group and obtains a member key unique to the remittance terminal. The remittance terminal carries out a group signature by using this member key. The reception terminal verifies the active electronic certificate obtained from the remittance terminal on the basis of the group signature. The reception terminal verifies a group signature by using a group public key preliminarily obtained from the management server. The verification server matches a certificate ID notified from the management server with a certificate ID included in the active electronic certificate verified by the reception terminal, and verifies availability of the active electronic certificate. Accordingly, the reception terminal is able to confirm the availability of the self-retaining active electronic certificate.

It is desirable that the management server includes an electronic money account database where a balance of the electronic money account is recorded in each reception terminal. The management server updates remaining money of an account corresponding to the reception terminal on the basis of a money amount shown in the active electronic certificate that is determined to be available by the verification server. Accordingly, the reception terminal is able to deposit the active electronic certificate into own account. Meanwhile, in a case where the certificate ID included in the active electronic certificate in an electronic money account provided other than the management server, a cash account and a credit account in a financial institute, or the certificate ID included in a charge account of a carrier and the like is not recorded in a certificate ID database, the reception terminal prohibits the use of the active electronic certificate.

The verification server erases the certificate ID recorded in the certificate ID database in accordance with the update of the account database. For this reason, the verification server according to the present invention is able to verify the availability of the electronic money on the basis of only information regarding a currently-circulating electric money among all of electronic money issued from the management server. In addition, in the erasing of the certificate ID of the electronic money from the certificate ID database, the certificate ID and the user ID for identifying the settled terminal may be linked each other and recorded in another database as an archive of use of the electronic money.

It is desirable that the reception terminal issues a lock request for the self-retaining active electronic certificate. In response to the lock request, the verification server prohibits the use of the active electronic certificate. Accordingly, it is desirable to issue a refresh request for illegal use of the electronic money. In response to the refresh request, the management server changes the certificate ID of the active electronic certificate, and notifies the verification server of the changed certificate ID. In this manner, when another terminal illegally obtains the issued certificate ID, it is possible to invalid the certificate ID and to prevent the electronic money from being illegally used.

The management server includes a certificate ID database for relating the certificate ID of the inactive electronic certificate to the remittance terminal of an issue destination of the inactive electronic certificate and recording them. Accordingly, the management server can specify an issue destination of the electronic money.

It is desirable that the management server gives the management server signature to the certificate information including the certificate ID by using the management server secret key and generates the inactive electronic certificate. The remittance terminal verifies the management server signature by using a management public key obtained from the management server.

It is desirable that the remittance terminal sets a use condition of the active electronic certificate. The verification server verifies the availability of the active electronic certificate on the basis of the use condition.

It is desirable that the use condition includes an expiration date when the active electronic certificate is available. Accordingly, a use limit of the active electronic certificate can be set.

It is desirable that a management server according to a first embodiment includes a credit balance data for recording a credit balance of the remittance terminal. The remittance terminal designates a use limit amount of inactive electronic money. The management server sets the use limit amount to the inactive electronic money, and updates the credit balance of the remittance terminal on the basis of the use limit amount. In addition, the management server may include an electronic money account where the electronic money of the remittance terminal is deposited separately from the credit balance database. The management server updates a deposit amount of this electronic money account on the basis of the designated use limit amount. When this electronic money account is used, the larger use limit amount of the inactive electric money can be used compared to a case of employing only the credit balance database.

According to the present invention, the illegal use and the improper use of certificate-type electronic money can be prevented. In addition, the anonymity between the remittance side of the electronic money and the reception side can be ensured. Moreover, the illegally-used electronic money can be traced.

BEST MODE FOR CARRYING OUT THE INVENTION

Figure 1:
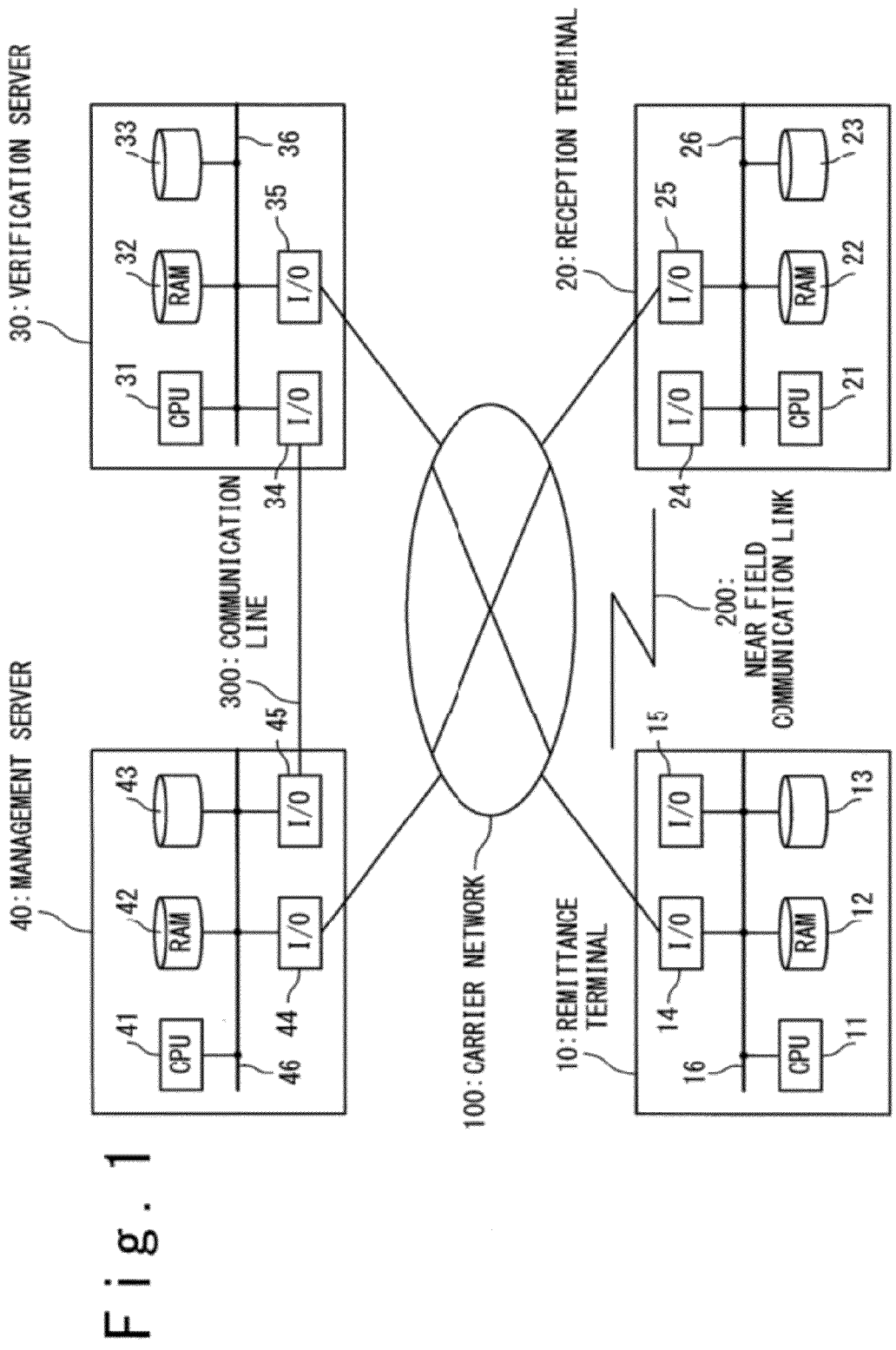
FIG. 1 is a view showing a configuration in a first embodiment of an electronic money system according to the present invention.

Referring to attached drawings, embodiments of an electronic money system according to the present invention will be explained below. In the drawings, same or similar reference numerals represent same, similar, or equivalent components.

1. First Embodiment

Referring to FIGS. 1 to 19, a first embodiment of the electronic money system according to the present invention will be explained. In the first embodiment, the electronic money system where the electronic money is traded between terminals connected to a network exemplified by a mobile communication network will be explained as one example. The electronic money treated here is an electronic certificate-type electronic money having value itself.

(Configuration)

Referring to FIGS. 1 to 7, a configuration of the first embodiment of the electronic money system according to the present invention will be explained. FIG. 1 is a view showing the configuration of the electronic money system in the first embodiment. Referring to FIG. 1, the electronic money system includes a remittance terminal 10, a reception terminal 20, a verification server 30, and a management server 40. Here, the remittance terminal 10, the reception terminal 20, the verification server 30, and the management server 40 are connected to a carrier network 100, respectively. However, the remittance terminal 10, the reception terminal 20, the verification server 30, and the management server 40 are not limited to a physical device but may be a Virtual Machine (VM) environment installed in a computer, practically.

The carrier network 100 is a communication network managed by a telecommunication carrier or a company (hereinafter referred to as a carrier). For example, the carrier network 100 is a mobile phone communication network, a fixed-line phone communication network, or a corporate LAN. The management server 40 is a computer device managed by an agency that issues the electronic money (hereinafter referred to as an issue agency) such as a carrier, a bank, or the like. The verification server 30 is a computer device managed by an agency that verifies the electronic money (hereinafter referred to as a verification agency). The verification agency may be any one of a company identical with the issue agency and a different company. As an example of the different company, a third-party agency or the like to which a verification operation for the electronic money is delegated by the issue agency can be considered. In the first embodiment, a form where an identical carrier manages the verification server 30 and the management server 40 as the issue agency and the verification agency will be explained as one example. In addition, the remittance terminal 10 and the reception terminal 20 in the first embodiment will be explained as a mobile terminal carried by an electronic money user (an individual or a company).

Here, an outline of the electronic money system in the first embodiment will be explained. In response to a request from the remittance terminal 10, the management server 40 issues inactive electronic money 500A that is an electronic certificate. On this occasion, a use limit amount is described in the inactive electronic money 500A, and an electronic signature (a management server signature 502A) is given by a secret key (a management server secret key 90) retained only by the management server 40.

The remittance terminal 10 enables the inactive electronic money 500A to produce active electronic money 600A. Here, the enabling is to allocate a money amount equal to the use limit amount or less to the inactive electronic money 500A and give a group signature 602A. In this manner, the active electronic money 600A becomes the electronic money usable for settlement (usable as currency).

The verification server 30 verifies availability of the active electronic money 600A. The reception terminal 20 that received the active electronic money 600A sends the active electronic money 600A to the verification server 30 at an arbitrary period and can verify the availability of the active electronic money 600A. In addition, the verification server 30 has a function for verifying the active electronic money 600A and preventing an illegal use of the electronic money (an illegal deposit to an account and a twice use).

The configuration of the electronic money system in the first embodiment will be explained in detail below.

The remittance terminal 10 is a communication terminal able to be connected to the carrier network 100 by an I/O interface 14. As an example of the remittance terminal 10, a mobile communication terminal, a computer, and the like can be considered.

The remittance terminal 10 includes a CPU 11, a RAM 12, a storage device 13, the I/O interface 14, an I/O interface 15, and a bus 16.

The CPU 11, the RAM 12, the storage device 13, the I/O interface 14, and the I/O interface 15 are connected via the bus 16. The CPU 11 controls the I/O interface 14 and the I/O interface 15 to control the sending and receiving of various types of data.

The I/O interface 14 is connected to the carrier network 100 via a wireless line or a wired line, and controls the sending and receiving of data between the remittance terminal 10 and the carrier network 100.

The I/O interface 15 can be connected to the reception device 20 via a near field communication link 200. The I/O interface 15 controls the sending and receiving of data with the reception device 20 connected via the near field communication link 200.

The remittance terminal 10 sends the active electronic money 600A to the reception terminal 20 via the near field communication link 200. Here, a communication using a communication protocol able to carry out a secret communication (for example, HTTPS (Hypertext Transfer Protocol over Transport Layer Security)) is preferable. The near field communication link 200 is, for example, the NFC (Near field Communication), the infrared communication line, or the Bluetooth (a registered trademark). Meanwhile, since the near field communication link 200 only has to be able to send and receive data between the remittance terminal 10 and the reception terminal 20, the line is not limited to a wireless line but may be a wired line. In addition, the data sent and received via the near field communication link 200 may be sent and received via the carrier network 100.

Figure 2:
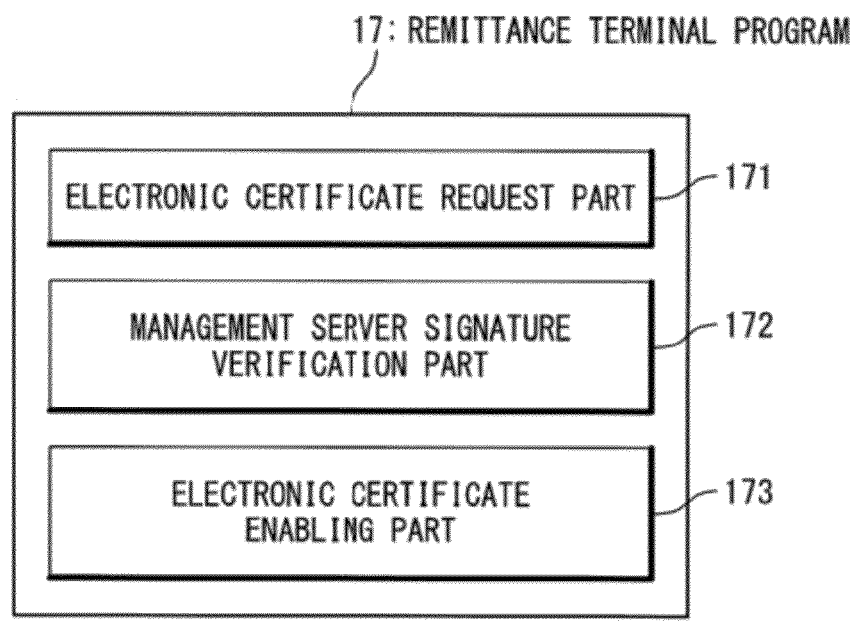
FIG. 2 is a view showing a function of a program for remittance terminal according to the present invention.

Additionally, the CPU 11 executes a remittance terminal program 17 stored in the storage device 13 to realize each function shown in FIG. 2.

Referring to FIG. 2, the remittance terminal program 17 includes an electronic certificate request part 171, a management server signature verification part 172, and an electronic certificate enabling part 173. Specifically, the CPU 11 executes the remittance terminal program 17 temporarily stored in the RAM 12 to realize the respective functions of the electronic certificate request part 171, the management server signature verification part 172, and the electronic certificate enabling part 173. That is, a configuration example of the remittance terminal program 17 shown in FIG. 2 shows a configuration example of the CPU 11 in executing the remittance terminal program 17.

The electronic certificate request part 171 requests the join to a group and the issue of electronic money to the management server 40. In the electronic money system according to the present invention, the electronic money is not issued to a terminal that is not registered as a group member in the management server 40. For this reason, the remittance terminal 10 has to be registered as a group member in the management server 40 prior to the issue of electronic money.

The management server signature verification part 172 verifies the management server signature 502A by using a management server public key 93. The electronic certificate enabling part 173 enables the inactive electronic money 500A issued from the management server 40 to produce the active electronic money 600A.

On this occasion, the electronic certificate enabling part 173 designates a money amount 611A to the inactive electronic money 500A, gives the group signature 602A by using a member key 94 created at a registration of group, and produce the active electronic money 600A.

In this manner, by executing the remittance terminal program 17, the remittance terminal 10 obtains the inactive electronic money 500A, designates a money amount of use, and produces the active electronic money 600A by giving an electronic signature.

Details of the group signature 602A given in producing the active electronic money 600A will be explained. In the present invention, a group signature method described, for example, in "G. Ateniese, J. Camenisch, M. Joye and G. Tsudik, "A Practical and Provably Secure Coalition-Resistant Group Signature Scheme", In Advances in Cryptology CRYPTO 2300, LNCS 1880, p 255-270, Springer-Verlag, 2000.".

The remittance terminal 10 registered as a member of the group in the management server 40 obtains the member key 94 unique to the remittance terminal 10 and member certification information 96. Specifically, the remittance terminal 10 generates a terminal public key, a terminal secret key, and signature partial information from random numbers and a group public key 91, and sends the terminal public key and the signature partial information to the management server 40.

The management server 40 generates a digital signature by using a signature group secret key 90A and the signature partial information received from the remittance terminal 10, and outputs the generated signature as the member certification information 96.

When the remittance terminal 10 retains the member certification information 96 signed by the management server 40, the registration to the group is guaranteed.

Meanwhile, the management server 40 sends partial information used for generating the member key 94 unique to the terminal to the remittance terminal 10.

The remittance terminal 10 generates the member key 94 unique to the remittance terminal 10 by using the random numbers generated at the group registration, the partial information from the management server 40, and a terminal secret key corresponding to the terminal public key.

As described above, a terminal (for example, the remittance terminal 10) registered as a member of the group in the management server 40 can obtain the member key 94 unique to the terminal and the member certification information 96. The remittance terminal 10 gives the electronic certificate a group signature by using the member key 94 and the member certification information 96. Specifically; the electronic certificate enabling part 173 of the remittance terminal 10 generates conversion data from the member key 94, the random numbers generated by a random number generator not shown, and the member certification information 96. The electronic certificate enabling part 173 generates the group signature 602A by using this conversion data and a message (the inactive electronic money and a use condition 601A). Meanwhile, as the group signature regarding the present invention, a group signature using a Well pair ring on an elliptic curve with a high processing speed or bilinearity of Tate pair ring is preferable.

The group signature can be verified by using the group public key 91 common in the group. Accordingly, the terminal (for example, the reception terminal 20) that verified the signature cannot specify the terminal (for example, the remittance terminal 10) that given the group signature.

However, the verification server 30 is able to extract the signed terminal public key of the remittance terminal 10 from the group signature by using a cryptogram group secret key 90B.

Meanwhile, the management server 40 correlates a user ID 95 of the remittance terminal 10 to the terminal public key, a digital signature give to the member certification information 96, and the like and records them at the group registration. Accordingly, when only the management server 40 obtains the terminal public key extracted from the group signature by the verification server 30, the remittance terminal 10 that enabled the electronic money can be specified.

The reception terminal 20 is a communication terminal able to be connected to the carrier network 100 by the I/O interface 24. As an example of the reception terminal 20, the mobile communication terminal, the computer, and the like can be considered.

The reception terminal 20 includes a CPU 21, a RAM 22, a storage device 23, an I/O interface 24, an I/O interface 25, and a bus 26.

The CPU 21, the RAM 22, the storage device 23, the I/O interface 24, and the I/O interface 25 are connected via the bus 26. The CPU 21 controls the I/O interface 24 and the I/O interface 25 to control the sending and receiving of various types of data.

The I/O interface 24 is able to be connected to the remittance terminal 10 via the near field communication link 200.

The reception terminal 20 obtains the active electronic money 600A from the remittance terminal 10 via the near field communication link 200. Here, the communication using the communication protocol able to carry out the secret communication (for example, HTTPS) is preferable.

In addition, the I/O interface 25 is connected to the carrier network 100 via a wireless line or a wired line, and controls the sending and receiving of data between the reception terminal 20 and the carrier network 100.

Figure 3:
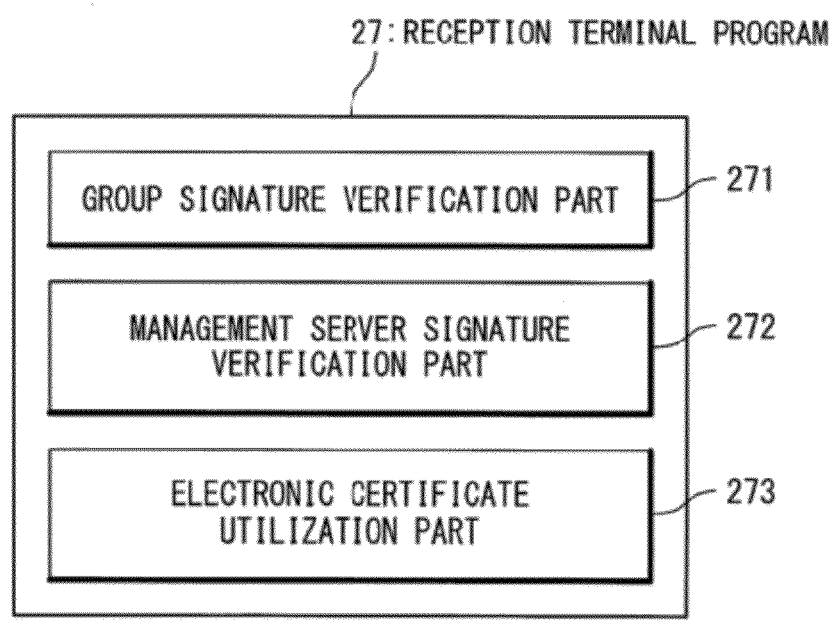
FIG. 3 is a view showing a function of a program for reception terminal according to the present invention.

Additionally, the CPU 21 executes a reception terminal program 27 stored in the storage device 23 to realize each function shown in FIG. 3.

Referring to FIG. 3, the reception terminal program 27 includes a group signature verification part 271, a management server signature verification part 272, and an electronic certificate utilization part 273. Specifically, the CPU 21 executes the reception terminal program 27 temporarily stored in the RAM 22 to realize the respective functions of the group signature verification part 271, the management server signature verification part 272, and the electronic certificate enabling part 273. That is, a configuration example of the reception terminal program 27 shown in FIG. 3 shows a configuration example of the CPU 21 in executing the reception terminal program 27.

By using the preliminarily-obtained group public key 91, the group signature verification part 271 verifies the group signature 602A given to the active electronic money 600A obtained from the remittance terminal 10.

By using the preliminarily-obtained management server public key 93, the management server signature verification part 272 verifies the management server signature 502A given to the active electronic money 600A.

In order to check whether or not the obtained active electronic money 600A is available, the electronic certificate enabling part 273 sends the active electronic money 600A to the verification server 30. The electronic certificate enabling part 273 carries out a settlement process of the active electronic money 600A. Specifically, the electronic certificate enabling part 273 sends the active electronic money 600A together with a settlement request to the verification server 30 or the management server 40, and deposits the money into an own account or an IC card.

The verification server 30 is a computer device able to be connected to the carrier network 100 by the I/O interface 35.

The verification server 30 includes a CPU 31, a RAM 32, a storage device 33, an I/O interface 34, an I/O interface 35, and a bus 36.

The CPU 31, the RAM 32, the storage device 33, the I/O interface 34, and the I/O interface 35 are connected via the bus 36. The CPU 31 controls the I/O interface 34 and the I/O interface 35 to control the sending and receiving of various types of data.

The I/O interface 34 is connected to the'management server 40 via a communication line 300. The I/O interface 34 controls the sending and receiving of data with the management server 40.

In addition, the I/O interface 35 is connected to the carrier network 100 via the communication line, and controls the sending and receiving of data between the verification server 30 and the carrier network 100.

Figure 4:
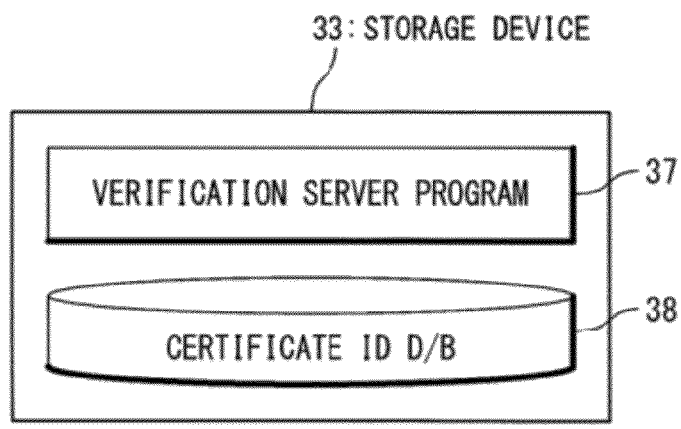
FIG. 4 is a view showing a configuration of a storage device included in a verification server according to the present invention.

Referring to FIG. 4, the storage device 33 stores a verification server program 37 and a certificate ID database (a certificate ID D/B) 38. The certificate ID database (a certificate ID D/B) 38 stores a certificated ID used for identifying the issued electronic money (the inactive electronic money 500A).

Figure 5:
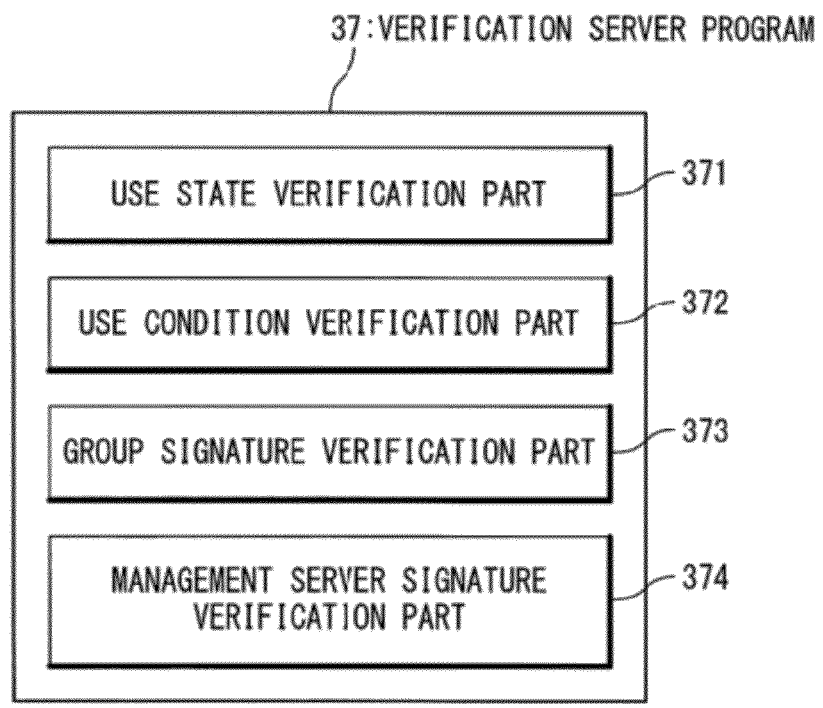
FIG. 5 is a view showing a function of a program for the verification server according to the present invention.

The CPU 31 executes the verification server program 37 to realize each function shown in FIG. 5.

Referring to FIG. 5, the verification server program 37 includes a use state verification part 371, a use condition verification part 372, a group signature verification part 373, and a management server signature verification part 374. Specifically, the CPU 31 executes the verification server program 37 temporarily stored in the RAM 32 to realize each function of the use state verification part 371, the use condition verification part 372, the group signature verification part 373, and the management server signature verification part 374. That is, a configuration example of the verification server program 37 shown in FIG. 5 shows a configuration example of the CPU 31 in executing the verification server program 37.

The use state verification part 371 registers a certificate ID issued from the management server 40 in the certificate ID database (certificate ID D/B) 38.

In accordance with a verification request or a settlement request, the use state verification part 371 verifies availability of the received active electronic money 600A, referring to the certificate ID database (certificate ID D/B) 38. Specifically, in a case where a certificate ID coincident with a certificate ID 513A included in the active electronic money 600A exists in the certificate ID database (certificate ID D/B) 38, the use state verification part 371 determines that the active electronic money 600A is available. A process after the money is determined to be available varies in the verification process and the settlement process.

In the case where the money is determined to be available in the verification process responding to the verification request, the use state verification part 371 correlates the user ID of the reception terminal 20 that requested the verification to the certificate ID, and stores them in the certificate ID database (certificate ID D/B) 38.

In the case where the money is determined to be available in the settlement process responding to the settlement request, the use state verification part 371 deletes the certificate ID from the certificate ID database (certificate ID D/B) 38, and stores a change history in an archive data base not shown in the drawing.

On the other hand, in a case where the certificate ID coincident with the certificate ID 513A does not exist in the certificate ID database (certificate ID D/B) 38, the use state verification part 371 determines that the active electronic money 600A is not available.

The use state verification part 371 notifies a verification client (for example, the reception terminal 20) and the management server 40 of a verification result. In addition, the use state verification part 371 notifies the management server 40 of the user ID sent from the verification client together with the verification result. Moreover, in a case where the money is determined to be unavailable in the verification responding to the settlement request, the use state verification part 371 may determine that the money is illegally used and report the illegal use to the management server 40 together with the user ID sent from a settlement client.

Since a certificate ID of the issued and unused electronic money is recorded in the certificate ID database (certificate ID D/B) 38, it is not required to accumulate all data regarding the used electronic money as in the related technique. For this reason, the use state of the electronic money can be verified in a small-sized database, and the illegal use can be checked. In addition, since the verification server 30 does not have information that enables the verification client to be specified on the basis of the user ID sent from the verification client, anonymity of the verification client (for example, the reception terminal 20) is ensured to the verification server 30.

As described above, the use condition as the electronic money is designated to the active electronic money 600A. Referring to this use condition, the use condition verification part 372 judges whether the active electronic money 600A is available or not.

Using the preliminarily-obtained group public key 91, the group signature verification part 373 verifies the group signature given to the active electronic money 600A obtained from the reception terminal 20.

Using the preliminarily-obtained management server public key 93, the management server signature verification part 374 verifies the management server signature given to the active electronic money 600A.

The management server 40 is a computer device able to be connected to the carrier network 100 by the I/O interface 44.

The management server 90 includes a CPU 91, a RAM 42, a storage device 43, an I/O interface 44, an I/O interface 45, and a bus 46.

The CPU 41, the RAM 42, the storage device 43, the I/O interface 44, and the I/O interface 45 are connected via the bus 46. The CPU 41 controls the I/O interface 44 and the I/O interface 45 to control the sending and receiving of various types of data.

The I/O interface 44 is connected to the carrier network 100 via the communication line, and controls the sending and receiving of data between the management server 40 and the carrier network 100.

The I/O interface 45 is connected to the verification server 30 via the communication line 300. The I/O interface 45 controls the sending and receiving of data with the management server 40. Normally, the sending and receiving of data between the management server 40 and the verification server 30 is carried out via the communication line 300.

The sending and receiving of data between the management server 40 and the verification server 30 may be carried out via the carrier network 100. However, it is preferable to carry out the communication between the verification server 30 and the management server 40 via the communication line 300 that is a dedicated line with a high strength in secret. In addition, the verification server 30 and the management server 40 may be provided in the same device or may be provided to be separately isolated.

Figure 6:
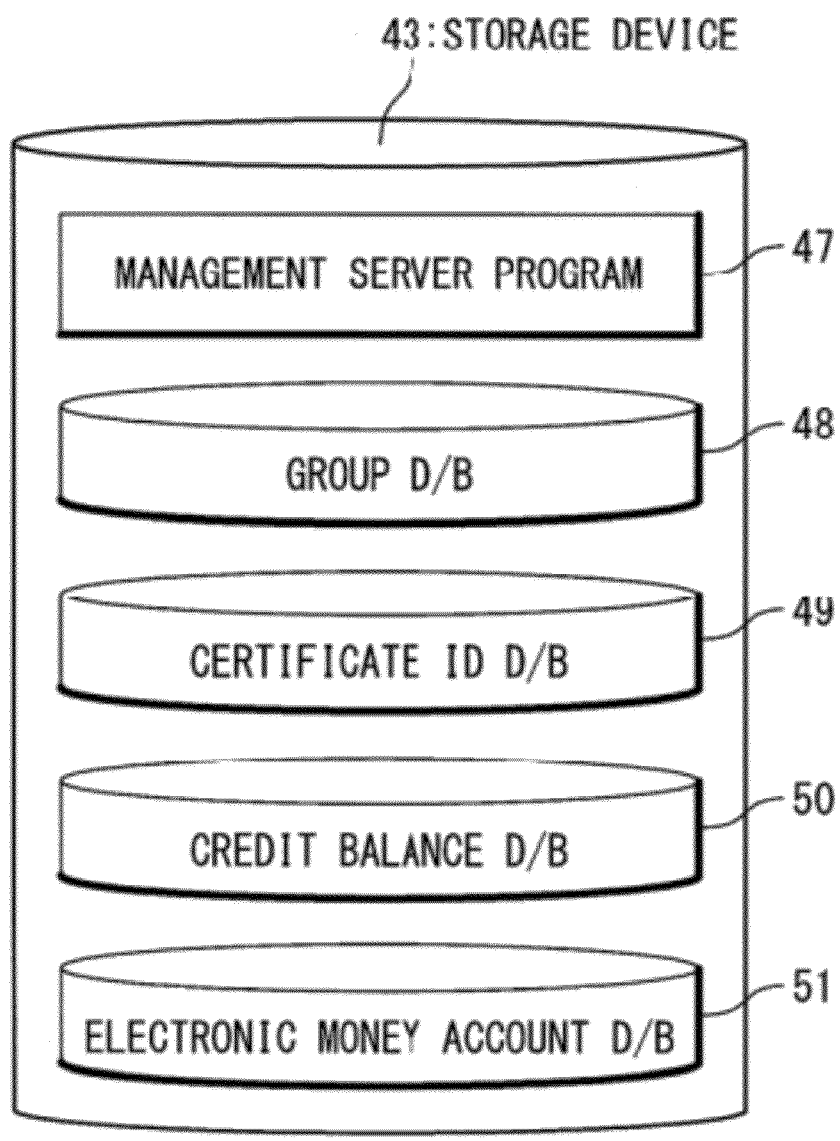
FIG. 6 is a view showing a configuration of a storage device included in a management server according to the present invention.

Referring to FIG. 6, the storage device 43 is provided with a management server program 47, a group data base (group D/B) 48, a certificate ID database (a certificate ID D/B) 49, a credit balance database (a credit balance D/B) 50, and an electronic money account database (an electronic money account D/B) 51.

Figure 7:
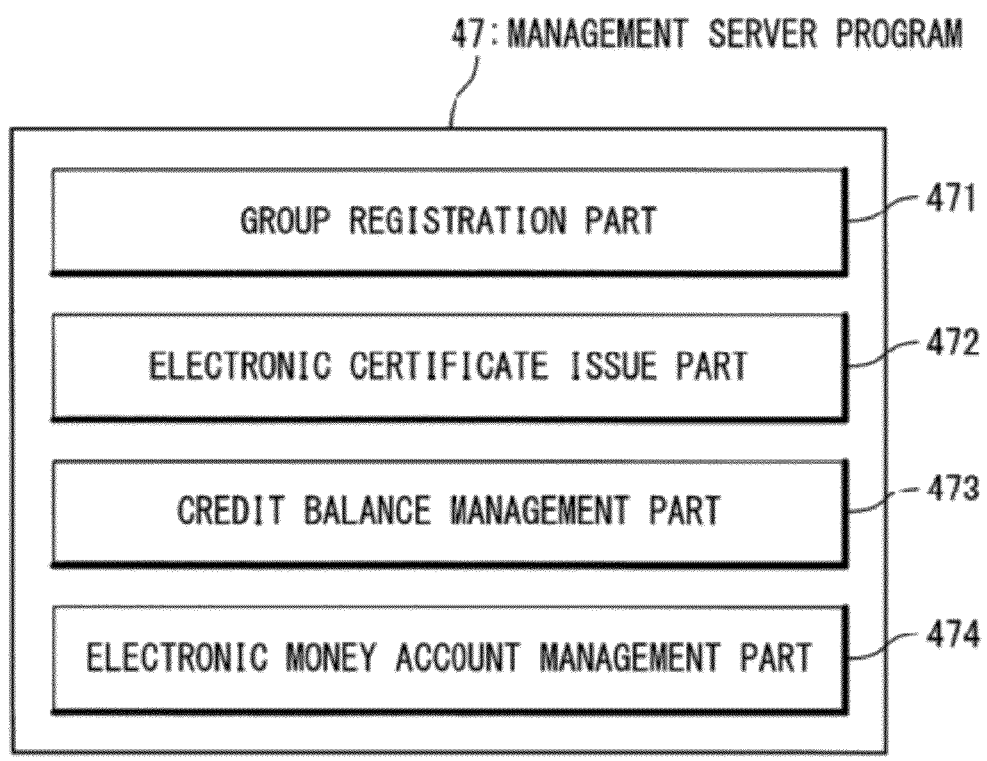
FIG. 7 is a view showing a function of a program for the management server according to the present invention.

The CPU 41 executes the management server program 47 to realize each function shown in FIG. 7.

Referring to FIG. 7, the management server program 47 includes a group registration part 471, an electronic certificate issue part 472, a credit balance management part 473, and an electronic money account management part 474. Specifically, the CPU 41 executes the management server program 47 temporarily stored in the RAM 42 to realize each function of the group registration part 471, the electronic certificate issue part 472, the credit balance management part 473, and the electronic money account management part 474. That is, a configuration example of the management server program 47 shown in FIG. 7 shows a configuration example of the CPU 41 in executing the management server program 47.

The group registration part 471 groups a plurality of the terminals in each category and registers the grouped terminals in the group database (the group D/B) 48. For example, the terminals are grouped in each carrier used by the terminal or are grouped in each category based on a use area and the personal information of the terminal user.

The group registration part 471 generates in each group a group secret key 90 (the signature group secret key 90A and the cryptogram group secret key 90B) and a group public key 91 (the signature group public key 91A and the cryptogram group public key 91B). The generated cryptogram group secret key 90B and cryptogram group public key 91B are sent to the verification server 30.

Meanwhile, in the case where the cryptogram group secret key 90B is desired to be secret to the management server 40, the group registration part 471 may preliminarily generate the cryptogram group secret key 90B and the cryptogram group public key 91B in the verification server 30 and may send only the cryptogram group public key 91B to the management server 40.

Additionally, in response to a request, the group registration part 471 generates the member certification information 96 unique to the terminal (for example, the remittance terminal 10). The group registration part 471 gives the user ID 95 user for identifying the terminal to each terminal in the group registration, and correlates this user ID 95 to the group (the group secret key 90 and the group public key 91) and stores them in the group database (the group D/B) 48.

Moreover, in a case of registering the terminal to which the member certificate information 96 is given in the group, the group registration part 471 also correlates this information to the user ID and registers them in the group database (the group D/B) 48. The group registration part 471 sends the group public key 91 to the terminal to be registered in the group, and generates partial information used for generating the member certificate information 96 and the member key 94. In this manner, the terminal that has been registered in the group database (the group D/B) 48 can use (enable) the electronic money (the inactive electronic money 500A) issued from the management server 40 as the electronic certificate.

In response to a request from the remittance terminal 10, the electronic certificate issue part 472 issues the inactive electronic money 500A that is the electronic certificate. On this occasion, the issue part determines the certificate ID used for identifying the inactive electronic money 500A and registers the certificate ID in the certificate ID database (the certificate ID D/B) 49. It is preferable to set the certificate ID different in each of inactive electronic money and random.

In addition, the electronic certificate issue part 472 correlates the user ID of the issuer of the inactive electronic money 500A to the certificate ID of the issued electronic money, and stores them in the certificate ID database (the certificate ID D/B) 49. In this manner, the management server 40 can correlate the issued electronic money to the terminal of the issuer (for example, the remittance terminal 10) and manage them.

Meanwhile, in a case where an identical carrier manages the verification server 30 and the management server 40, the certificate ID database (the certificate ID D/B) 38 and the certificate ID database (the certificate ID D/B) 49 may be integrated. In addition, the certificate ID corresponding to the settled (deposited) electronic money is deleted from the certificate ID database (the certificate D/B) 49. On this occasion, the electronic certificate ID may be recorded in a database for an archive not shown in the drawing together with an ID of the terminal (the user ID 95) to which the money has been deposited. Moreover, in response to a refresh request, the electronic certificate issue part 472 gives a new electronic certificate ID to the electronic money, and updates the certificate ID database (the certificate ID D/B) 49.

The credit balance management part 473 manages a credit balance recorded in the credit balance database (the credit balance D/B) 50. The credit balance database (the credit balance D/B) 50 is a database for recording the credit balance of each terminal (for example, the remittance terminal 10) able to use the inactive electronic money 500A issued from the management server 40. The credit balance management part 473 updates the credit balance corresponding to the remittance terminal 10 in accordance with the use limit amount allocated to the issued inactive electronic money 500A and the money amount included in the verification result notified from the verification server 30. Here, it is preferable that the managed credit balance is correlated to the user ID of the remittance terminal 10 registered in the group. That is, it is preferable that the terminal (the remittance terminal 10) can use the credit balance database (the credit balance D/B) 50 after the group registration.

The electronic money account management part 474 manages an electric money account stored in the electronic money account database (the electronic money account D/B) 51. The electronic money account database (the electronic money account D/B) 51 has the electronic money account of each terminal (for example, the reception terminal 20). The electronic money account management part 474 deposits the money amount included in the active electronic money 600A to an electronic money account corresponding to the terminal that requested the deposit.

In addition, the electronic money account management part 474 pays the money amount requested from the terminal from the electronic money account database (the electronic money account D/B) 51 as needed. Meanwhile, the electronic money account management part 474 and the electronic money account database (the electronic money account D/B) 51 may be provided to a computer device other than the management server 40. In this case, the electronic money account database (the electronic money account D/B) 51 may be managed by an agency other than the carrier owning the management server 40.

In the above-mentioned configuration, according to the electronic money system of the present invention, the following items can be realized.

(1) The issuer of the electronic money is guaranteed owing to the management server signature.

(2) The signature verification of the electronic money becomes possible keeping the anonymity of the remittance terminal 10 owing to the group signature.

(3) Since the remittance terminal 10 (the user ID) of the issuer is correlated to the certificate ID of the issued electric money in the management server 40, the traceability of the electronic money can be realized.

(4) The reception terminal 20 that received the electronic money (the active electronic money 600A) can verify the availability of the electronic money in an arbitrary period.

(5) The illegal use of the electronic money can be prevented by the verification server 30.

(6) Since the availability of the electronic money is verified by using the certificate ID given to each of electronic money, a data amount used for preventing the illegal use can be reduced.

(7) The availability of the electronic money can be limited by giving the use condition to the electronic money.

(Operation)

Referring to the drawings, details of an operation in the first embodiment of the electronic money system according to the present invention will be explained.

The remittance terminal 10 has to be registered in the group before obtaining the electronic certificate (the inactive electronic money 500A to which a use limit amount is designated) from the management server 40. In addition, the reception terminal 20 has to preliminarily obtain the group public key 91 in order to use the electronic money (the active electronic money to which a money amount is designated) passed from the remittance terminal 10.

Figure 8:
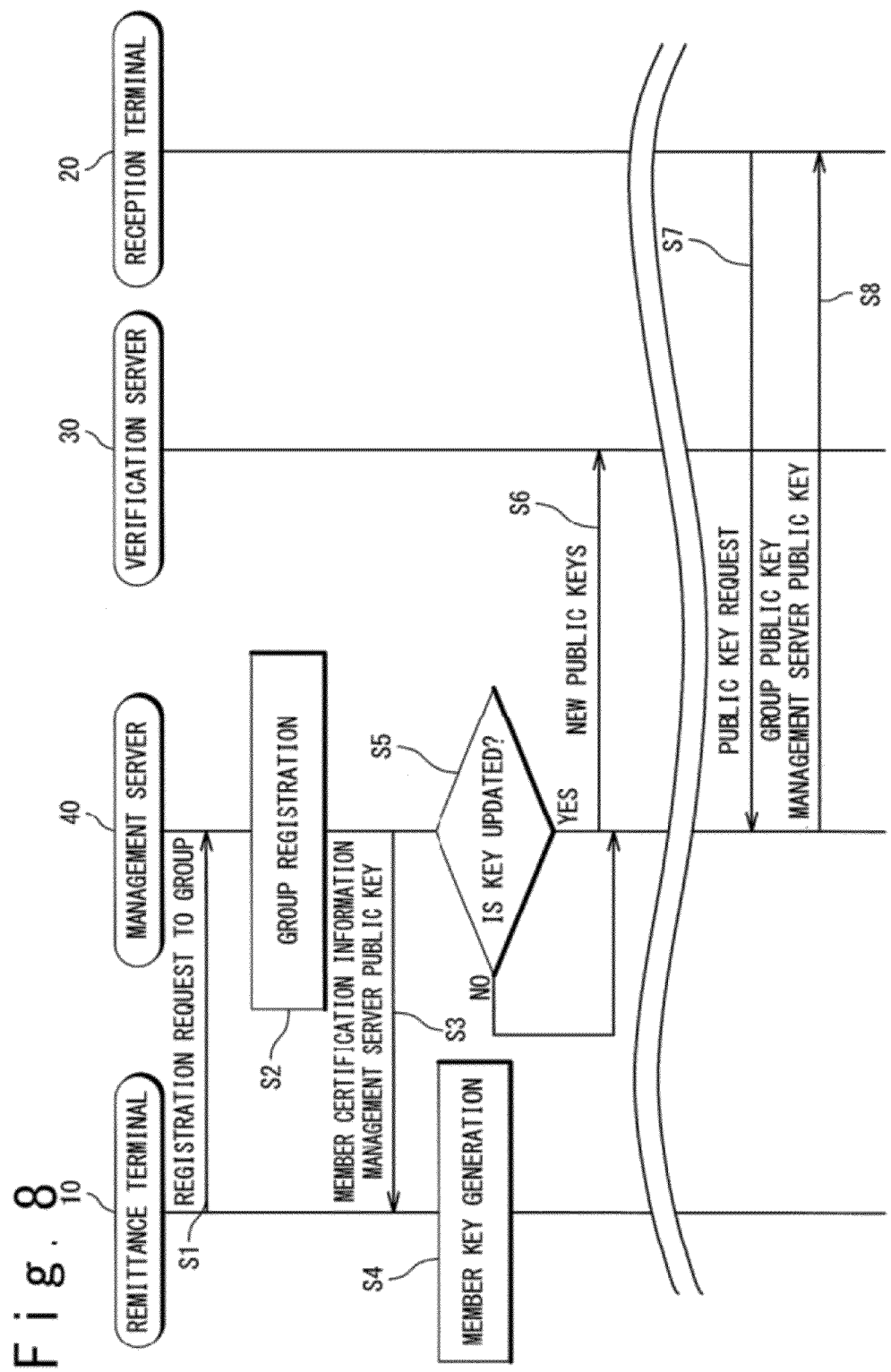
FIG. 8 is a sequence diagram showing a group registration process and a public key obtaining process of the electronic money system according to the present invention.

Referring to FIG. 8, operations of the group registration of the remittance terminal 10 according to the present invention and the obtaining of the group public key of the reception terminal 20 will be explained. Firstly, the group registration of the remittance terminal 10 will be explained.

Here, prior to the group registration process of the remittance terminal 10, the management server 40 generates in each group the group secret key 90 (the signature group secret key 90A and the cryptogram group secret key 90B) and the group public key 91 (the signature group public key 91A and the cryptogram group public key 91B). The management server 40 sends the generated cryptogram group secret key 90B and the cryptogram group public key 918 to the verification server 30.

Meanwhile, in a case where the cryptogram group secret key 90B and the cryptogram group public key 91B are desired to be secret to the management server 40, the verification server 30 may preliminarily generate the cryptogram group secret key 90B and the cryptogram group public key 91B and may send only the cryptogram group public key 91B to the management server 40.

(1) Step S1

To the management server 40, the remittance terminal 10 issues a registration request to the group.

(2) Step S2

In response to the group registration request, the management server 40 registers the remittance terminal 10 to the preliminarily-prepared group.

Though it is not shown in the drawings, when the group registration request from the remittance terminal 10 has been issued, the group registration part 471 of the management server 40 determines the group in which the remittance terminal 10 is registered on the basis of the information included in the registration request (for example, information regarding the carrier to which the remittance terminal 10 belongs). Then, the group registration part 471 sends the group public key 91 of the determined group to the remittance terminal 10. The remittance terminal 10 generates the terminal public key, the terminal secret key, and the signature partial information by using random numbers and the group public key 91, and sends the terminal public key and the signature partial information to the management server 40.

The group registration part 471 generates the member certification information 96 unique to the remittance terminal 10 by using the signature partial information and the signature group secret key 90A. On this occasion, the group registration part 471 obtains the user ID 95 unique to the remittance terminal 10, and registers this user ID 95 to the group. Here, the user ID 95, the member certification information 96, the group (the group secret key 90 and the group public key 91), and the terminal public key sent in the group registration from the remittance terminal 10 are linked and stored in the group data base (the group D/B) 48. In this manner, the terminal public key unique to the remittance terminal 10 is correlated to the user ID 95 and information used for specifying the remittance terminal 10 (for example, information regarding a user of the remittance terminal 10 or information of address enabling an access to the remittance terminal 10), and is stored in the group database (the group D/B) 48.

Meanwhile, in response to a request for the group registration from the remittance terminal 10, the group registration part 471 may set a new group (the group secret key 90 and the group public key 94), and may register the remittance terminal 10 to this group or may register the terminal to the existing group. In addition, in the case where the management server 40 is managed by the carrier managing the carrier network 100, it is preferable that the group registration is carried out in making a contract for the remittance terminal 10 and the reception terminal 20 to use the carrier network 100.

(3) Step S3

Upon completion of the group registration, the management server 40 sends the management server public key 93, the user ID 95, and the member certification information 96 to the remittance terminal 10. On this occasion, the management server 40 sends to the remittance terminal 10 the partial information used for generating the member key 94 unique to the terminal.

(4) Step S4

The remittance terminal 10 generates the member key 94 unique to the remittance terminal 10 on the basis of the sent partial information and random numbers by using the terminal secret key corresponding to the terminal public key. Here, the management server public key 93 may be preliminarily distributed to the remittance terminal 10.

(5) Step S5

In addition, in the case of generating the new group secret key 90 and group public key 91 in the group registration process and the group preparation process or a case of updating the management server public key 93 to a new key, the management server 40 detects the generation or update of the key.

(6) Step S6

Upon detection of the generation or update of the key, the management server 40 sends the new cryptogram group secret key 90B, group public key 91, and management server public key 93 to the verification server 30.

In this manner, the management server 40 distributes the keys to the verification server 30 every time when updating the new group secret key 90, group public key 91, and management server public key 93. Accordingly, the verification server 30 can constantly obtain the new cryptogram group secret key 90B, group public key 91, and management server public key 93. Additionally, in response to the request from the verification server 30, the management server 40 may send the latest cryptogram group secret key 90B, group public key 91, or management server public key 93.

(7) Step S7

On the other hand, the reception terminal 20 obtains the group public key 91 and the management server public key 93 from the management server 40 at an arbitrary period. Specifically, the reception terminal 20 firstly issues a request for the public key to the management server 40. The request for the public key may include information used for designating a desired group (the group publication 91) (for example, information to specify the carrier).

(8) Step S8

In response to the request for the public key, the management server 40 sends the group public key 91 and the management server public key 93 to the reception terminal 20. Here, in a case where the group has been designated, the management server 40 is desired to send the group public key 91 of the designated group.

In addition, the reception terminal 20 may carry out the group registration process in the same manner as that of the remittance terminal 10 (Step S1 to Step S3). In this manner, the reception terminal 20 can obtain the member certification information 96 and generate the member key 94 unique to the reception terminal 20.

In this case, the reception terminal 20 is desired to include a same function as that of the electronic certificate enabling part 173 included in the remittance terminal 10. When the reception terminal 20 includes the electronic certificate enabling part 173, the inactive electronic money 500A whose certificate ID 513A has been rewritten by the management server 40 can be enabled in a refresh process described later.

Meanwhile, the group that the reception terminal 20 registers may be a same group as that of the remittance terminal 10 or another group.

As described above, when registered to the group managed by the management server 40, the remittance terminal 10 (the reception terminal 20) can enable and use the inactive electronic money 500A issued by the management server 40. In addition, when the group public key 91 and the management server public key 93 are obtained, each configuration inside the electronic money system can verify the signature of the electronic money.

Meanwhile, the user ID 95 may be subscriber information recorded in a UIM (User Identity Module) and SIM (Subscriber Identity Module) cards. In this case, since the user ID 95 is the information only the carrier to which the terminal subscribes can know, the carrier is desired to manage the management server 40. In this manner, a secret of information for specifying the user (the remittance terminal 10 and the reception terminal 20) can be heightened. In this case, the terminal (for example, the remittance terminal 10) is a communication terminal having the SIM card (not shown in the drawing) in which the user ID 95 is written.

Figure 9:
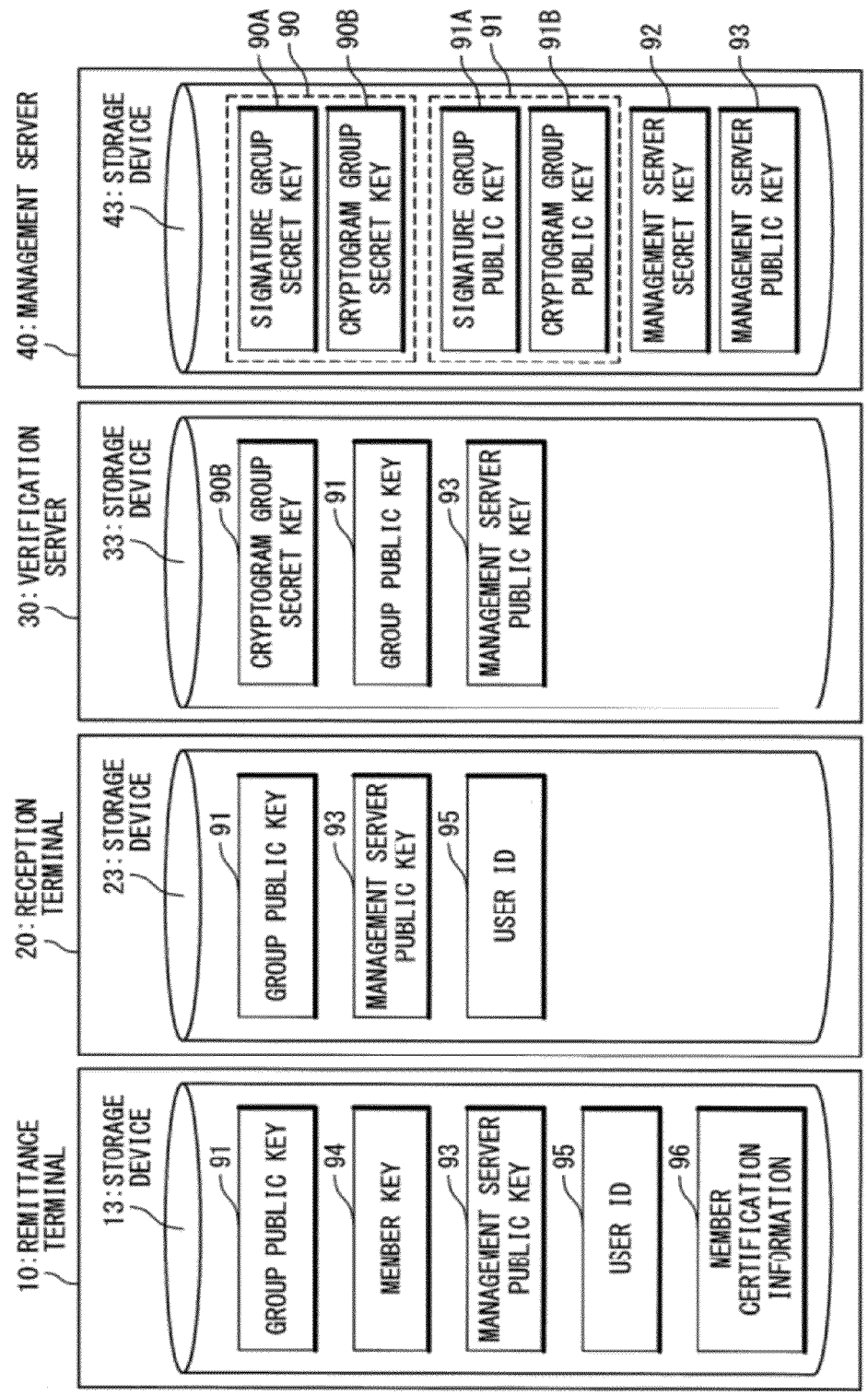
FIG. 9 is a view showing kinds of keys retained by the respective components in the electronic money system according to the present invention.

FIG. 9 shows the retention state of the keys of respective components in the electronic money system according to the present invention. Here is shown the retention state of the keys after the remittance terminal 10 has carried out the group registration and the reception terminal 20 has issued the request for the public key.

In the group registration, the remittance terminal 10 obtains the group public key 91, the member key 94, the management server public key 93, and the member certification information 96, and stores them in the storage device 13. In addition, the remittance terminal 10 stores and retains the user ID 95 allocated to the remittance terminal 10 in the storage device 13 or the SIM card not shown in the drawing.

The reception terminal 20 obtains the group publication key 91 and the management server public key 93 by issuing the request for the public key, and stores them in the storage device 23. In addition, the reception terminal 20 stores and retains the user ID 95 allocated to the reception terminal 20 in the storage device 23 or the SIM card not shown in the drawing. Moreover, in the case where the reception terminal 20 is registered in the group as in the same case of the remittance terminal 10, the member key 94 and the member certificate information 96 are stored in the storage device 23 (not shown in the drawing).

The verification server 30 stores the cryptogram group secret key 90B, the group public key 91, and the management server public key 93 in the storage device 33.

The management server 40 stores the group secret key 90, the group public key 91, the management server secret key 92, and the management server public key 93 in the storage device 43. In addition, the management server 40 links the terminal public key of the terminal (the remittance terminal 10 or the reception terminal 20) registered in the group to the user ID 95 unique to the terminal and records them in the group database (the group D/B) 48. Accordingly, the management server 40 can specify the remittance terminal 10 and the reception terminal 20 by using the user ID 95.

Figure 10:
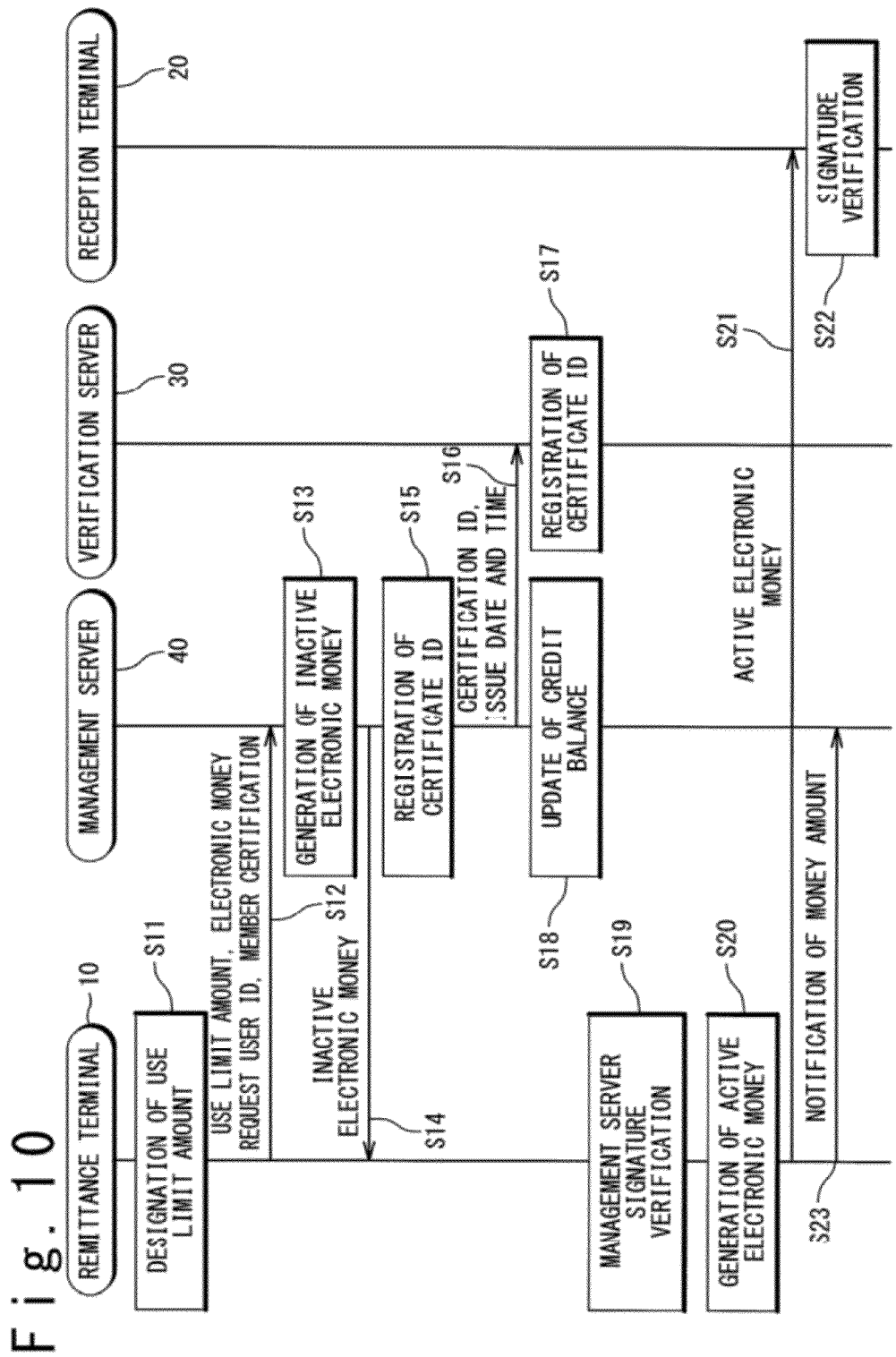
FIG. 10 is a sequence diagram showing operations of issue and remittance processes of the electronic money in the electronic money system according to the present invention.

Next, referring to FIG. 10, details of an operation from the issue of the electronic money to the remittance and reception in the present embodiment will be explained.

(1) Step S11

The remittance terminal 10 designates a use limit amount of the electronic money.

(2) Step S12

The remittance terminal 10 issues to the management server 40 a request for electronic money that designates the use limit amount. Here, the use limit amount is information to designate an upper limit of a money amount able to be set to the electronic certificate (the inactive electronic money 500A) issued from the management server 40.

(3) Step S13

The management server 40 that received the request for electronic money generates the inactive electronic money to which the designated use limit amount is set. Specifically, the electronic certificate issue part 472 of the management server 40 checks whether the remittance terminal 10 is registered in the group or not referring to the user ID 95 and the member certification information 96, and in the case where the terminal is registered in the group, generates the inactive electronic money 500A based on the designated use limit amount.

Figure 11:
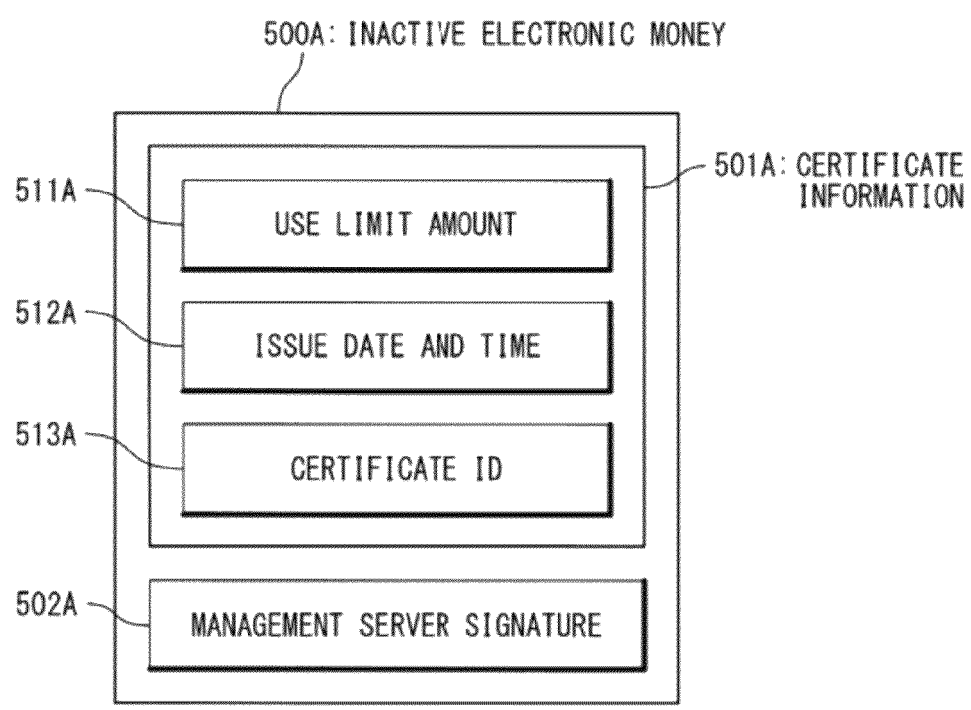
FIG. 11 is a view showing a configuration of inactive electronic money according to the present invention.

Here, the electronic certificate issue part 472 generates the certificate information 501A. Referring to FIG. 11, the certificate information 501A includes a use limit amount 511A, an issue date and time 512A, and the certificate ID 513A. The use limit amount 511A shows the designated use limit amount. The issue date and time 512A may be only a standard character string or may be a timestamp that guarantees a generation time of the certificate information 501A with accurate time information. The certificate information ID 513A shows a certificate ID used for identifying the inactive electronic money.

Next, the electronic certificate issue part 472 gives the management server signature 502A to the certificate information 501A by using the management server secret key 92, and generates the inactive electronic money 500A.

(4) Step S14

The management server 40 issues the generated inactive electronic money 500A to the remittance terminal 10 that is the request source via the carrier network 100.

(5) Step S15

On this occasion, the management server 40 registers and notifies the certificate ID allocated to the issued inactive electronic money 500A, and updates the credit balance (Steps S15, S16, and S18). Specifically, the electronic certificate issue part 472 of the management server 40 correlates the certificate ID 513A allocated to the inactive electronic money 500A, the issue data and time 512A, and the user ID 95 of the issuer with each other, and registers them in the certificate ID database (the certificate ID DIE) 49.

(6) Step S16

In addition, the electronic certificate issue part 472 notifies the verification server 30 of the certificate ID 513A and the issue date and time 521A via the communication line 300.

(7) Step S17

The verification server 30 correlates the notified certificate ID 513A and the issue date and time 512A with each other, and registers them in the certificate ID database (the certificate ID D/B) 38.

(8) Step S18

The credit balance management part 473 of the management server 40 updates the credit balance database (the credit balance D/B) 50 on the basis of the use limit amount 511A. Here, the money amount equivalent to the use limit amount 511A is withdrawn from the credit balance correlated to the remittance terminal 10. For example, in a case where the credit balance corresponding to the remittance terminal 10 is 10000 and the use limit amount 511A is 1000, the updated credit balance is 9000.

Additionally, an execution order of the registration notification process of the certificate ID at step S15 and step S16 and the credit balance update process at step S18 is not limited to the above-mentioned order if executed after the issue of the inactive electronic money.

Moreover, in addition to the credit balance database (the credit balance D/B) 50, the management server 40 may include the electronic money account D/B in which the electronic money of the remittance terminal 10 is deposited. This electronic money account D/B may use the electronic money account database (the electronic money account D/B) 51 shown in FIG. 6. In this case, the management server 40 withdraws the money amount equivalent to the use limit amount 511A from this electronic money account D/B in issuing the inactive electronic money 500A. When only the credit balance database (the credit balance D/B) 50 is used, the amount of the electronic money available to the remittance terminal 10 is limited to the credit balance, but when such credit balance D/B is used, further high amount of the electronic money can be used.

Additionally, in the case of issuing the inactive electronic money 500A, the management server 40 may use the credit balance D/B and the electronic money account D/B in combination, and may issue the money by using only the credit balance D/B or only the electronic money account D/B. Obviously, the credit balance D/B may use the credit balance database (the credit balance D/B) 50 shown in FIG. 6. In addition, this electronic money account D/B may use the electronic money account database (the electronic money account D/B) 51 shown in FIG. 6, and may be a database exclusively used for the issue of the inactive electronic money.

(9) Step S19

Upon reception of the inactive electronic money 500A, the remittance terminal 10 carries out the signature verification of the management server signature 502A by using the management server public key 93. In this manner, it can be confirmed that the inactive electronic money 500A was regularly issued from the management server 40.

(10) Step S20

In the case where the management server signature is accepted in the signature verification, the remittance terminal 10 generates the active electronic money 600A acting as currency on the basis of the inactive electronic money 500A as the electronic certificate.

Figure 12:
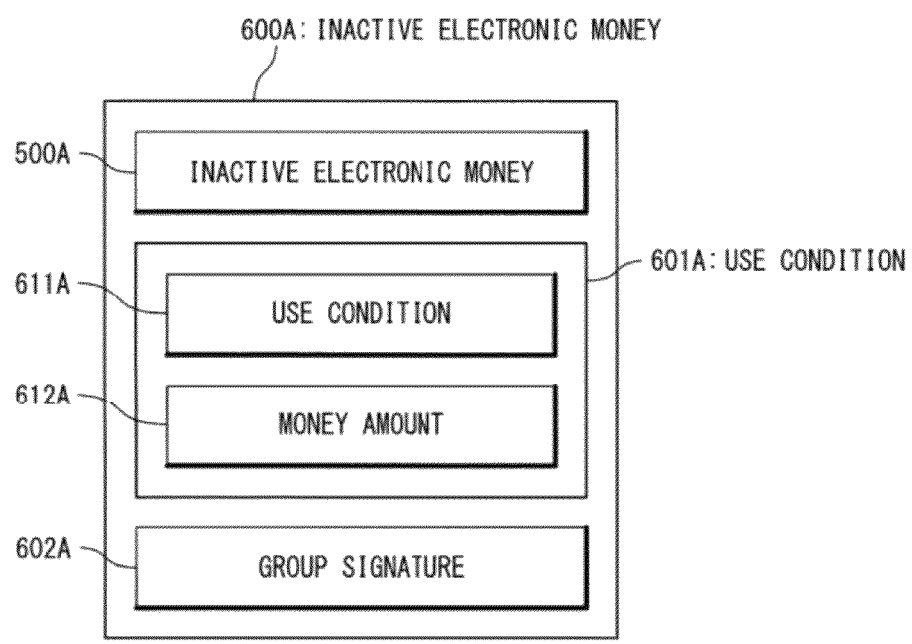
FIG. 12 is a view showing a configuration of active electronic money according to the present invention.

Here, by using the member key 94, the member certification information 96 and the like, the electronic certificate enabling part 173 of the remittance terminal 10 gives the group signature 602A to information (a message) that adds the use condition 601A to the inactive electronic money 500A, and generates the active electronic money 600A as shown in FIG. 12.

On this occasion, the electronic certificate enabling part 173 may give the group signature 602A by using random numbers, the group public key 91, or a common variable. Information to be set as the use condition 601A is a money amount 611A that determines a value of the active electronic money 600A and is an expiration date 612A that determines an available period of the active electronic money 600A.

In addition, an address of the verification server 30 that is a verification destination of the active electronic money 600A may be included. In the enabling process at step S20, the active electronic money 600A turns into the electronic money having currency value.

Meanwhile, the money amount 611A has to be set to determine the currency value necessarily, but the expiration date 612A does not have to be set. Additionally, a condition to limit use of the electronic money different from the expiration date 612A (for example, information of a shop accepting the money) may be added as the use condition 601A.

(11) Step S21

The remittance terminal 10 sends the generated active electronic money 600A to the reception terminal 20 (step S21).

In the remittance of the active electronic money 600A, it is desirable that the remittance terminal 10 is connected to the reception terminal 20 via the near field communication link 200. In response to the remittance request from the reception terminal 20 (not shown in the drawing), the remittance terminal 10 sends the active electronic money 600A via the near field communication link 200. When the remittance terminal 10 remits via the near field communication link 200, a user can remit the electronic money easily and without spending a communication cost.

In addition, the remittance terminal 10 may carry out the remittance of the active electronic money 600A via the carrier network 100. When remitting via the carrier network 100, the remittance terminal 10 can remit the electronic money to a person in a long distance. In this case, it is desirable that the remittance terminal 10 sends the active electronic money 600A through a communication that uses a communication protocol able to realize a secret communication.

One example of the remittance will be shown below.

In a case where a service user has the remittance terminal 10 and the service provider has the reception terminal 20, the active electronic money 600A is remitted as value of the service from the remittance terminal 10 to the reception terminal 20. Or, in a case where an issuer company of company currency has the remittance terminal 10 and a user of the company currency has the reception terminal, the active electronic money 600A is remitted (issued) as the company currency from the remittance terminal 10 to the reception terminal 20. In this case, it is desirable that the money amount 611A allocated to the active electronic money 600A is set to a money amount based on a request from the reception terminal 20 (not shown in the drawing).

(12) Step S22

Upon reception of the active electronic money 600A, the reception terminal 20 verifies the management server signature 502A by using the management server public key 93 and verifies the group signature 602A by using the group public key 91. In this manner, the reception terminal 20 judges whether or not the active electronic money 600A is the regular electronic money. Since the group signature 612A is given to the active electronic money 600A, the reception terminal 20 can verify the electronic money without knowing information regarding the remittance terminal 10.

(13) Step S23

After the remittance of the active electronic money 600A, the remittance terminal 10 notifies the management server 40 of the money amount 611A allocated to the active electronic money 600A. On this occasion, the management server 40 updates the credit balance of the user ID corresponding to the certificate ID 513A on the basis of the remitted money amount 611A.

Here, a money amount equivalent to the difference between the use limit amount 511A and the money amount 611A is added to the credit balance corresponding to the remittance terminal 10. For example, in a case where the credit balance is 9000, the use limit amount 511A is 1000, and the money amount 611A is 600, the updated credit balance is 9400. In this manner, the actually-used (remitted) money amount is withdrawn from the credit balance.

In addition, as described later, the update of the credit balance based on the money amount 611A may be carried out at the time when the remitted active electronic money 600A has been verified in the verification server 30 or when the remitted active electronic money 600A has been settled (deposited into an account of the remittee).

For example, according to a method for updating the credit balance in response to the notification of the money amount 611A at step S23, the credit balance can be updated in an arbitrary period after the remittance (normally, immediately after the remittance).

However, in this case, since the remittance terminal 10 has to be connected to the management server 40 in order to update the credit balance, it requires effort and time. In addition, since the money amount notified from the remittance terminal 10 has to be reliable, the remittance terminal 10 has to include a function for preventing interpolation of the information.

On the other hand, according to a method for updating the credit amount at the verification or the deposit of the active electronic money 600A, the remittance terminal 10 does not have to be connected to the management server 40 after the remittance and does not require the function for preventing interpolation. Especially, when the credit balance is updated at the deposit, consistency between a use amount and the remittance amount can be certainly ensured.

However, in this case, the credit balance is not updated unless the terminal of the remittee (the reception terminal 20 here) verifies or deposits the active electronic money 600A, and thus a state where the credit balance is equal to or fewer than the money amount remitted by the remittance terminal 10 may be continued.

It is desirable that the above-mentioned update method (update timing) of the credit balance is chosen on the basis of a characteristic of the electronic money system.

Figure 13:
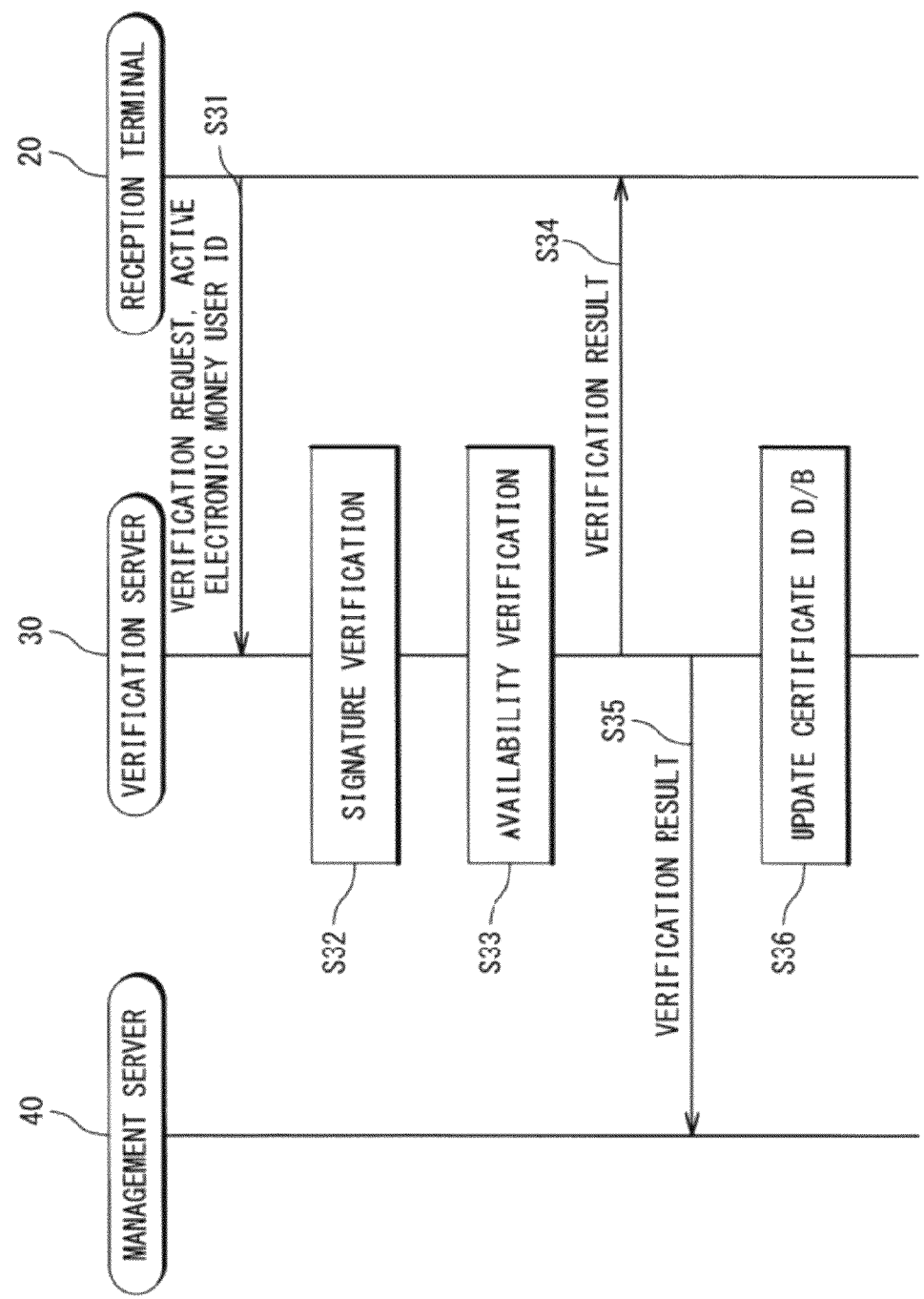
FIG. 13 is a sequence diagram showing an operation of a verification process for the active electronic money in the electronic money system according to the present invention.

Next, referring to FIG. 13, the verification process of the active electronic money 600A will be explained.

When obtaining the active electronic money 600A, the remittance terminal 20 can verify whether the active electronic money 600A is available or not at an arbitrary timing. Prior to the verification, the remittance terminal 20 is connected to the verification server 30 via the carrier network 100. On this occasion, the verification server 30 is specified by using an address of the verification server included in the use condition 601A.

(1) Step S31

The remittance terminal 20 sends the active electronic money 600A together with the verification request to the verification server 30 via the carrier network.

(2) Step S32

In response to the verification request, the verification server 30 verifies the management server signature 502A by using the latest management server public key 93, and verifies the group signature 602A by using the latest group public key 91.

(3) Step S33

In a case where the active electric money 600A is the regular electric money, the verification server 30 verifies its availability. The verification of the availability based on the certificate ID and the verification of the availability based on the use condition are carried out at step S33. Specifically, the use state verification part 371 of the verification server 30 confirms whether or not the certificate ID coincident with the certificate ID 513A included in the active electronic money 600A is registered in the certificate ID database (the certificate ID D/B) 38. On this occasion, in the case where the certificate ID coincident with the certificate ID 513A is registered, the use state verification part 371 judges the case as acceptance, and in the case where the certificate ID coincident with the certificate ID 513A is not registered, the use state verification part 371 judges the case as rejection.

In addition, referring to the use condition 601A included in the active electronic money 600A, the use condition verification part 372 judges whether or not the active electronic money 600A is available. For example, in the case where the expiration date 612A is designated as the use condition 601A, the availability is judged based on whether the present time passes the expiration date or not.

Moreover, in the case where the expiration date 612A shows a predetermined date, the use condition verification part 372 calculates a period at the present time on the basis of an issue date and time registered in the certificate ID database (the certificate ID D/B) 38 or of the issue date and time 512A included in the active electronic money 600A, and judges the availability based on whether the period passes the expiration date or not.

(4) Step S34

The verification server 30 notifies the reception terminal 20 of the verification result at step S33.

(5) Step S35

In addition, the verification server 30 notifies the management server 40 of the verification result at step S33.

In a case where the illegal use of the active electronic money is detected in the verification (in a case where the active electronic money that is not registered in the certificate ID data base (the certificate ID D/B) 36 is sent), the verification server 30 may notify the management server 40 of the case as the verification result.

On this occasion, by using the cryptogram group secret key 90B, the verification server 30 extracts from the active electronic money 600A the terminal public key of the remittance terminal 10 to which the group signature 612A is given, and sends the key together with the verification result to the management server 40. Since the terminal public key is linked with information to specify the remittance terminal 10 (the user ID 95 or the subscriber information of the carrier network 100) in the management server 40, only the carrier having the management server 40 can know which terminal has illegally used or accidentally sent the electronic money.

In addition, the verification server 30 may send the certificate ID 513, the use limit amount 511A, and the money amount 611A included in the active electronic money 600A together with the verification result to the management server 40. In this manner, the management server 40 can update the credit balance of the remittance terminal 10 specified from the certificate ID 513 (update of the credit balance at the electronic money verification).

(6) Step S36

The verification server 30 that notified the verification result correlates the user ID 95 of the verification request source to the certificate ID corresponding to the verified active electronic money 600A, and updates the certificate ID database (the certificate ID D/B) 38.

On this occasion, in a case where the certificate ID is recorded with the certificate ID correlated to another user ID 95, the user ID is rewritten to the new user ID 95 and a change history is recorded in the archive data base not shown in the drawing. For example, in a case where the reception terminal 20 remits the verified active electronic money 600A to another reception terminal 20 and the another reception terminal 20 verifies the active electronic money 600A, the previously-verified user ID 95 of the reception terminal 20 is rewritten to the user ID 95 of the another reception terminal 20.

Accordingly, the verification server 30 can know the latest user ID 95 of the terminal with which the active electronic money 600A is verified (normally, the user ID 95 of the terminal retaining the active electronic money 600A at the present time) by updating the user ID recorded in the certificate ID database (the certificate ID D/B) 38.

The verification server 30 can limit use of the presently-circulating electronic money by operating the certificate ID database (the certificate ID D/B) 38. For example, in a case where assets of a user of the remittance terminal 10 is attached by a public agency, the verification server 30 deletes the certificate ID of the inactive electronic money 500A issued to the remittance terminal 10 from the certificate ID database (the certificate ID D/B) 38. Accordingly, the active electronic money 600A generated by the remittance terminal 10 becomes unavailable. In this manner, the limitation of use of the electronic money can be briefly realized.

In addition, when locking or refreshing the electronic money, the reception terminal 20 retaining the active electronic money 600A can prevent the illegal use of the active electronic money 600A by another terminal (third party).

It is desirable that the reception terminal 20 has carried out the verification of the retained active electronic money 600A before carrying out the locking and refreshing. In this manner, the user ID 95 of the reception terminal 20 is registered in the verification server 30, and the verification server 30 can recognize the registered reception terminal 20 as a latest retainer of the active electronic money 600A.

Figure 14:
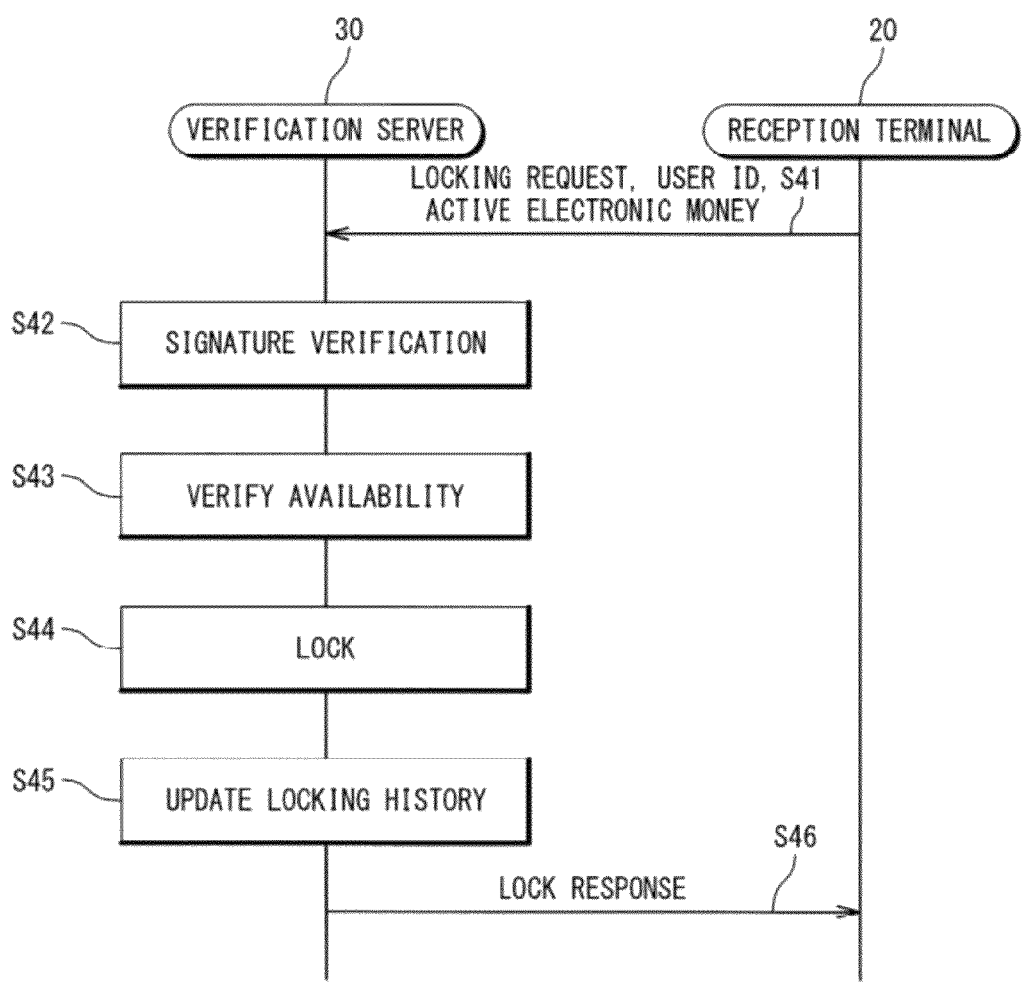
FIG. 14 is a sequence diagram showing an operation of a locking process in the electronic money system according to the present invention.

Referring to FIG. 14, an operation of the locking process in the present invention will be explained.

(1) Step S41

The reception terminal 20 is connected to the verification server 30 via the carrier network 100, and issues the locking request to the verification server 30. On this occasion, the reception terminal 20 sends the active electronic money 600A and the user ID 95 together with the locking request.

(2) Step S42

Similar to step S32, the verification server 30 carries out the signature verification of the active electronic money 600A (steps S42 and S43).

(3) Step S43

Similar to step S33, the verification server 30 verifies the availability of the active electronic money 600A (steps S42 and S43). On this occasion, it is desirable that the verification server 30 refers to the certificate ID database (the certificate ID D/B) 38 and confirms the terminal of request source of the locking based on whether the sent user ID 95 has been already registered or not.

(4) Step S44

In the signature verification and the verification of availability, the verification server 30 carries out the locking process of the active electronic money 600A when the active electronic money 600A is acceptable.

In the rocking process, the verification server 30 places a flag indicating the lock on the certificate ID stored in the certificate ID database (the certificate ID D/B) 38 to prevent the active electronic money 600A from being used.

Even when the active electronic money 600A has the certificate ID 513A corresponding to the certificate ID, the verification server 30 determines the money as the rejection in the case where the money is locked, and refuses the settlement process (the deposit process).

Additionally, at step S43, the verification server 30 may confirm the request source of the locking by using a password that only the reception terminal 20 knows. When the reception terminal 20 sets the password to the verification server 30 at the verification of the active electronic money 600A carried out prior to the lock request, the password can be used.

(5) Step S45

Upon finishing the lock process, the verification server 30 correlates the user ID 95 of the reception terminal 20 of the request source of the locking to the certificate ID 513A of the active electronic money 600A to be locked, and records them as history in the archive database that is not shown in the drawing. In this manner, the history of the terminal locked to the active electronic money 600A can be managed.

(6) Step S46

After the lock process, the verification server 30 notifies completion of the locking to the reception terminal 20 as a lock response. This notification may be carried out to the management server 40. In this case, the management server 40 may record histories of: a lock process same as step S44; and a lock process same as step S45 to own certificate ID database (the certificate ID D/B) 49 in accordance with the notification of completion of the locking.

Release of the locking can be realized by removing the flag indicating the locking from the corresponding certificate ID in accordance with a lock release process from the reception terminal 20 in the same manner as the above-mentioned lock process.

As described above, since the reception terminal 20 can lock the deposit process of the retained active electronic money 600A, the illegal use by the third-party can be prevented. As the characteristic of the electronic money, the active electronic money 600A retained by the reception terminal 20 often passes through another terminal. Thus, the active electronic money is in danger of being copied by a passing terminal. In such case, when the lock process is carried out by using the user ID and the password, the active electronic money can be prevented from being illegally used and the lock process by the third-party also can be prevented.

Figure 15:
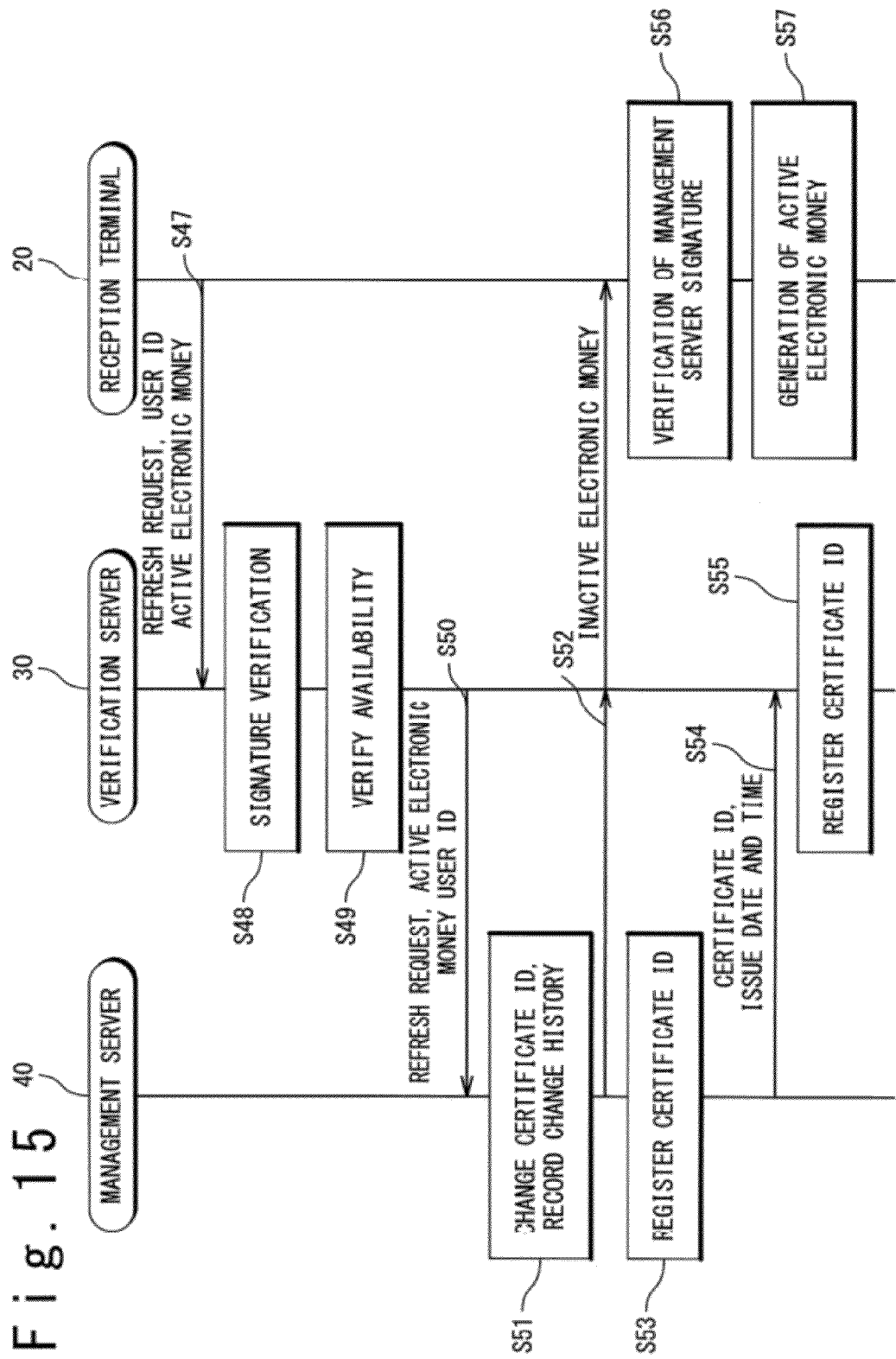
FIG. 15 is a sequence diagram showing an operation of a refreshing process in the electronic money system according to the present invention.

Referring to FIG. 15, an operation of the refresh process in the present invention will be explained.

Here, it is assumed that the reception terminal 20 able to request of the refreshing have had the member key 94 and the member certification information 96 in the group registration.

(1) Step S47

The reception terminal 20 is connected to the verification server 30 via the carrier network 100, and issues the refresh request to the verification server 30. On this occasion, the reception terminal 20 sends the active electronic money 600A and the user ID 95 together with the lock request.

(2) Step S48

The verification server 30 carries out the signature verification of the active electronic money 600A in the same manner as that of step S32.

(3) Step S49

In addition, the verification server 30 verifies the availability of the active electronic money 600A in the same manner as that of step S33.

(4) Step S50

Here, in the case of the acceptance, the verification server 30 issues the refresh request to the management server 40. On this occasion, the verification server 30 sends the active electronic money 600A and the user ID 95 of the request source together with the refresh request.

(5) Step S51

In response to the refresh request, the management server 40 changes the certificate ID 513A of the sent active electronic money 600A into a new certificate ID. Specifically, the electronic certificate issue part 472 of the management server 40 issues the new certificate ID in response to the refresh request, and rewrites the certificate ID 513. The electronic certificate issue part 472 links the certificate ID before the change to the certificate ID after the change and stores them in the certificate ID database (the certificate ID D/B) 49. In this manner, the management server 40 can create a change history of the certificate ID. The electronic certificate issue part 472 generates the inactive electronic money 500A to which the management server signature 502A is given by using the management server secret key 92 with respect to the certificate information 501A including the new certificate ID.

(6) Step S52

The management server 40 sends the inactive electronic money 500A whose certificate ID 513 has been rewritten to the reception terminal 20. On this occasion, the electronic certificate issue part 472 sets the money amount 611A of the active electronic money 600A to be refreshed to the new use limit amount 511A, and gives them to the inactive electronic money 500A. For example, in a case where the money amount 611A is "600", "600" is set to the use limit amount 511A.

Specifically, the management server 40 sends the generated inactive electronic money 500A to the reception terminal 20 via the verification server 30. Here, the management server 40 sends the inactive electronic money 500A to the verification server 30 via the communication line 300. The reception terminal 20 sends the inactive electronic money 500A to the connected reception terminal 20 via the carrier network 100. Meanwhile, after the connection between the reception terminal 20 and the verification server 30 is terminated, the inactive electronic money 500A may be sent from the management server 40 to the reception terminal 20 via the carrier network 100.

(7) Step S53

The management server 40 registers the certificate ID of the newly-issued inactive electronic money 500A in the same manner as that of the above-mentioned step S15.

(8) Step S54

In addition, the management server 40 notifies the verification server 30 of the certificate ID of the newly-issued inactive electronic money 500A.

(9) Step S55

The verification server 30 rewrites and updates the old certificate ID existing in the certificate ID database (the certificate ID D/B) 38 into the new certificate ID. In addition, the verification server 30 may obtain the certificate ID 512A and the issue date and time 513A from the inactive electronic money 500A and update the certificate ID database (the certificate ID D/B) 38 in relaying the inactive electronic money 500A sent from the management server 40 to the reception terminal 20 at step S52.

(10) Step S56

Upon reception of the inactive electronic money 500A, the reception terminal 20 verifies the management server signature 502A by using the management server public key 93. In this manner, the inactive electronic money 500A regularly issued from the management server 40 can be confirmed.

(11) Step S57

In the case of the acceptance in the signature verification, the reception terminal 20 gives the group signature by using the member key 94 and the member certification information 96 in the same manner as that of step S20, and generates the active electronic money 600A acting as currency.

Meanwhile, at step S49, the verification server 30 may confirm the request source of the refreshing by using a password that only the reception terminal 20 knows. When the reception terminal 20 sets the password to the verification server 30 at the verification of the active electronic money 600A carried out from step S31 to step S36, the password can be used.

In a case where the active electronic money 600A has passed through another server, another terminal, or an unreliable network, the certificate ID 513A is in danger of being leaked to the passing server, the passing terminal, or the unreliable network. In the present invention, since the certificate ID 513A of the retaining active electronic money 600A can be changed through the refresh process, the illegal use by the third party can be prevented even when the certificate ID 513A has been leaked.

Next, referring to FIGS. 16 to 19, the settlement process (the deposit process) of the active electronic money 600A according to the present invention will be explained.

Figure 16:
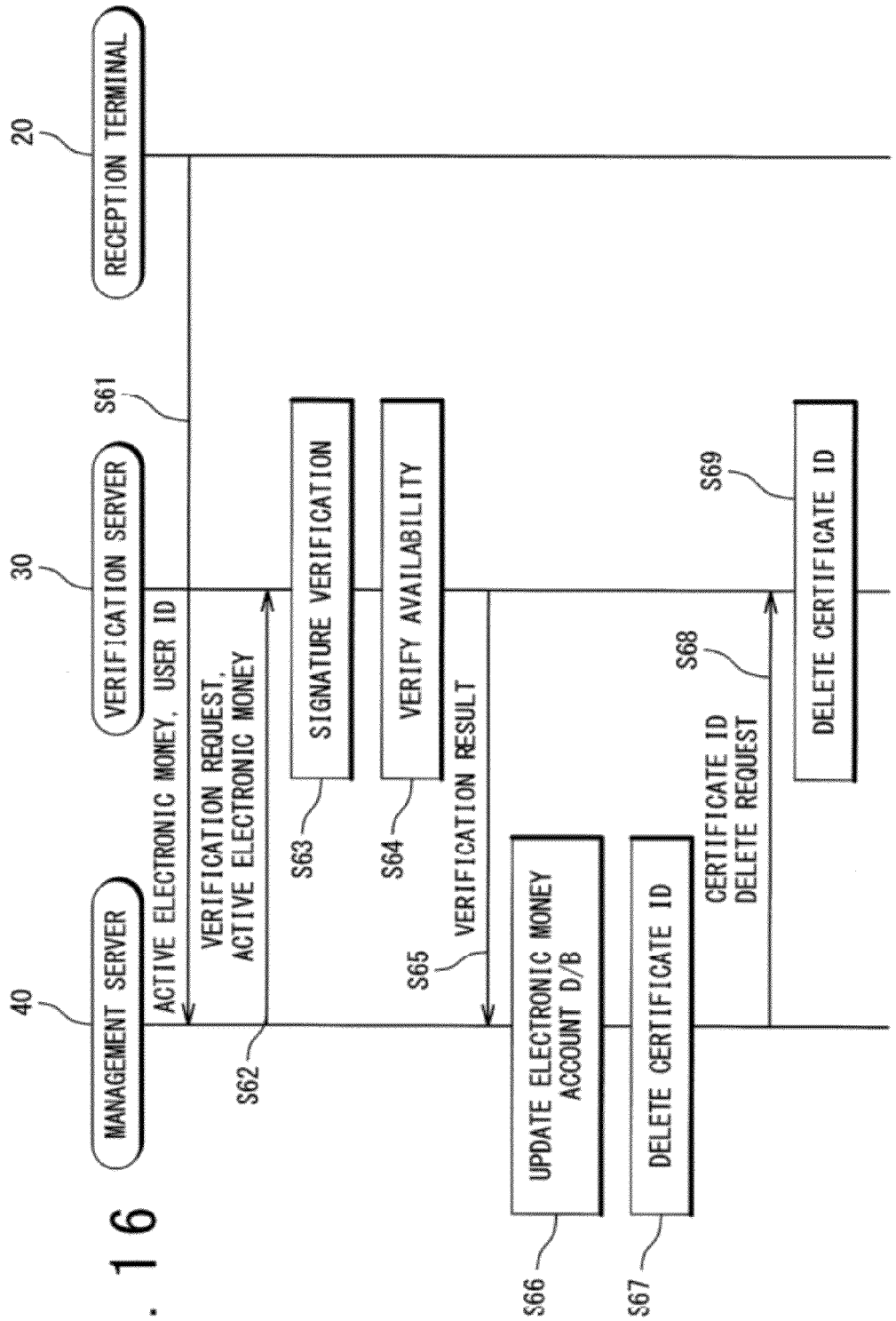
FIG. 16 is a sequence diagram showing one example of an operation of a deposit process of the active electronic money in the electronic money system according to the present invention.

Referring to FIG. 16, an operation of the deposit process to an electronic money account provided to the management server 40 will be explained. The reception terminal 20 is connected to the management server 40 via the carrier network 100 in order to deposit the retained active electronic money 600A.

(1) Step S61

The reception terminal 20 issues the settlement request to the management server 40, and sends the active electronic money 600A and the user ID 95.

(2) Step S62

In response to the settlement request, the management server 40 issues the verification request of the active electronic money 600A to the verification server 30, and sends the active electronic money 600A to be verified.

(3) Step S63

The verification server 30 executes the signature verification in the same manner as that of step S32.

(4) Step S64

The verification server 30 executes the verification of the availability in the same manner as that of step S33.

(5) Step S65

The management server 40 receives the verification result from the verification server 30.

(6) Step S66

The management server 40 carries out the deposit process to the electronic money account database (the electronic money account D/B) 51 on the basis of the received verification result. Here, the account corresponding to the sent user ID 95 is updated on the basis of the money amount 611A written in the active electronic money 600A.

(7) Step S67

Upon updating the electronic money account database (the electronic money account D/B) 51, the management server 40 deletes the certificate ID 513A of the active electronic money 600A deposited from own certificate ID database (the certificate ID D/B) 49.

(8) Step S68

The management server 40 issues a delete request of the certificate ID to the verification server 30. On this occasion, the management server 40 may record the electronic certificate ID of the deposited active electronic money 600A in the archive database not shown in the drawing together with the ID (here, the user ID 95 of the reception terminal 20) of a deposited terminal. In this manner, a history of a user of the electronic money can be managed. In addition, this history information may be periodically deleted.

(9) Step S69

In response to the delete request from the management server 40, the verification server 30 deletes the certificate ID from the certificate ID database (the certificate ID D/B) 39. Accordingly, the verification server 30 verifies the availability of the electronic money based on only information (the certificate ID) regarding the presently-circulating electronic money among all of the electric money issued from the management server 40.

In addition, upon updating the electronic money account database (the electronic money account D/B) 51, the management server 40 issues to the reception terminal 20 a settlement response to the settlement request, which is not shown in the drawing.

Moreover, the management server 40 may update the credit balance of the remittance terminal 10 specified from the certificate ID 513 on the basis of the use limit amount 511A and the money amount 611A included in the deposited active electronic money 600A.

Here, a form where the settlement request is issued from the reception terminal 20 to the management server 40 in the deposit process, but the settlement request may be issued to the management server 40 via the verification server 30. In this case, the verification server 30 deposit the money amount 611A into the electronic money account database (the electronic money account D/B) 51 of the management server 40 through the transaction process. Meanwhile, the electronic money account 51 may be provided outside the management server 40.

Additionally, in response to the settlement request from the reception terminal 20, the verification server 30 may deposit the active electronic money 600A into another external electronic money account, an account and a credit account of a financial institution, or a charge account of the carrier through the transaction process.

Figure 17:
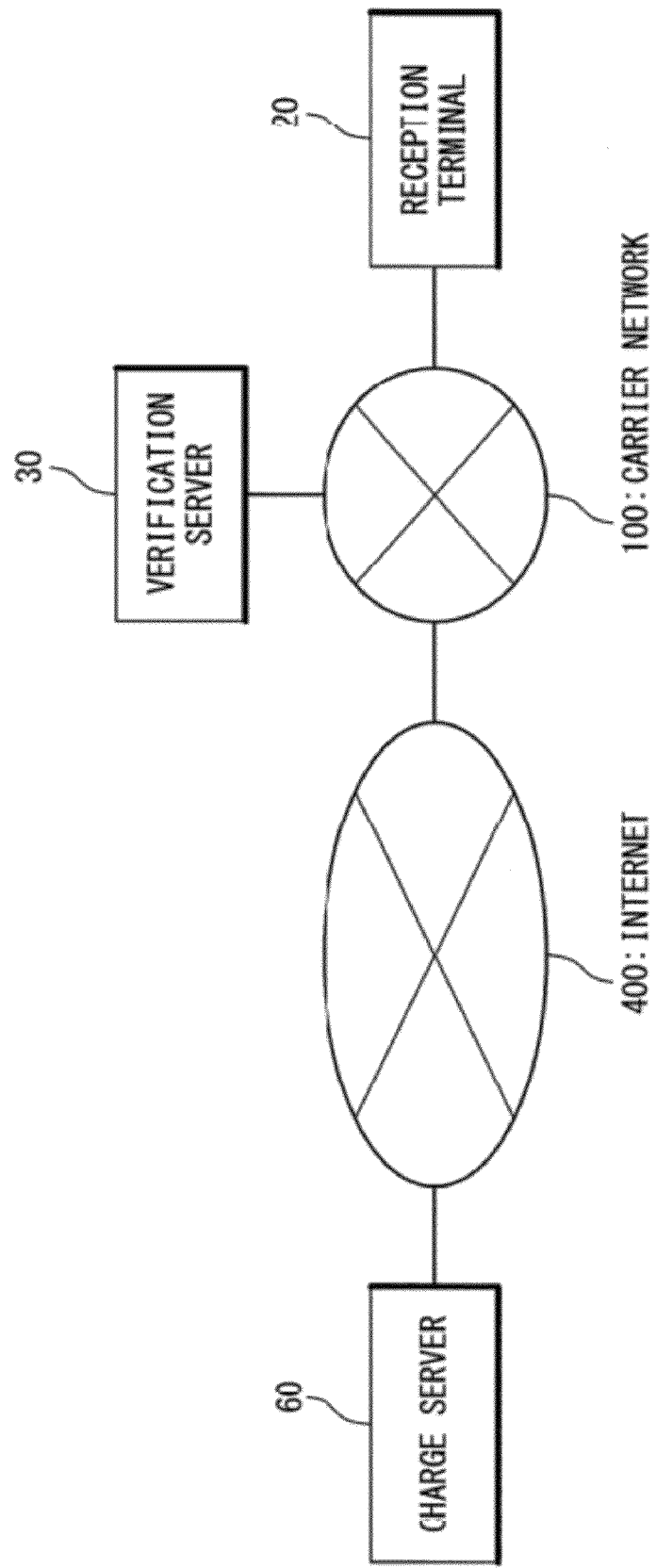
FIG. 17 is a view showing a configuration of an electronic money system including a reception terminal having an IC card.

Moreover, as shown in FIG. 17, the reception terminal 20 may have an IC card 80 able to charge the electronic money (for example, the MIFARE (registered trademark), the FeliCa (registered trademark), and the ELWISE (registered trademark)). Furthermore, the near field communication link 15 may be incorporated in the IC card 80.

Figure 18:
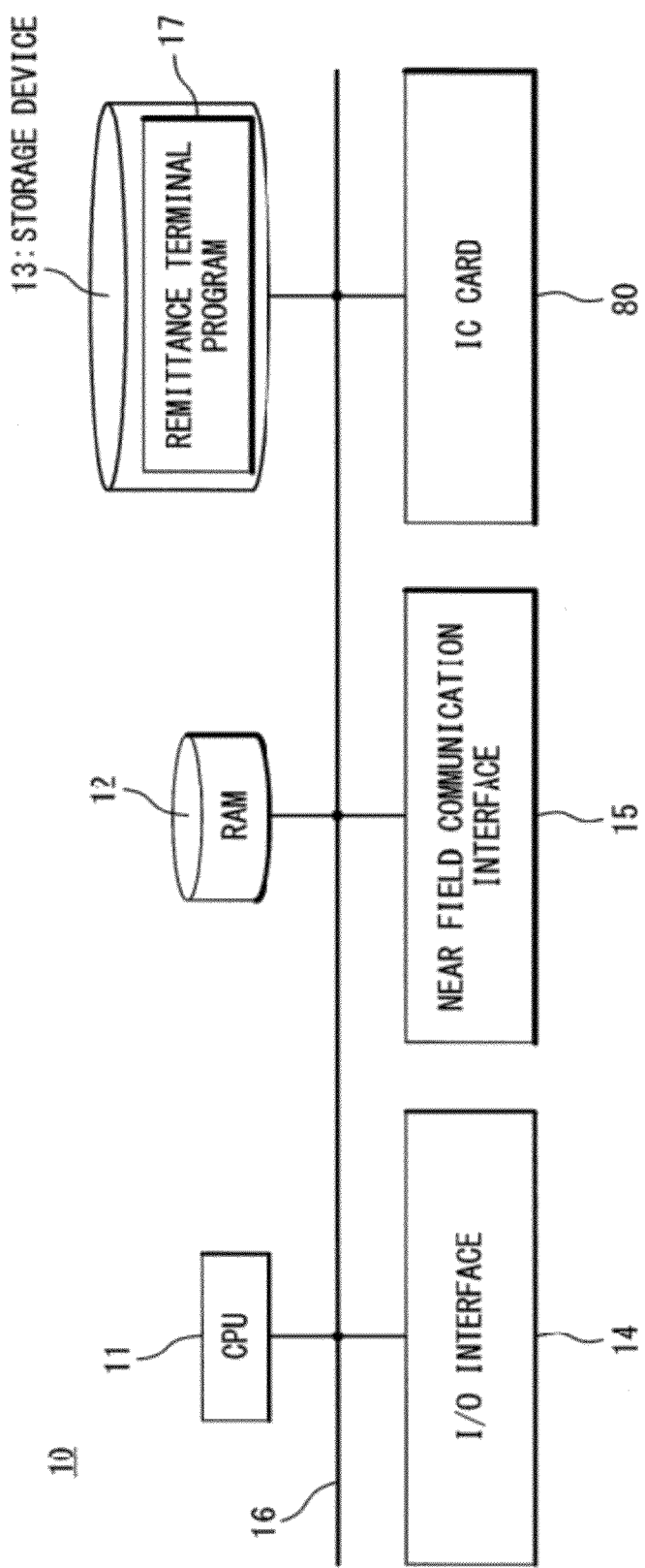
FIG. 18 is a view showing a configuration of the reception terminal having the IC card.

As shown in FIG. 18, in a form where the reception terminal 20 has the IC card 80, it is desirable that the electronic money system according to the present invention includes a charge server 60 that is able to be connected to the carrier network 100 via the global network (for example, the internet 400). In response to the deposit request from the reception terminal 20, the charge server 60 according to the present invention deposits a money amount written in the active electronic money 600A into the IC card 80 of the reception terminal 20.

Figure 19:
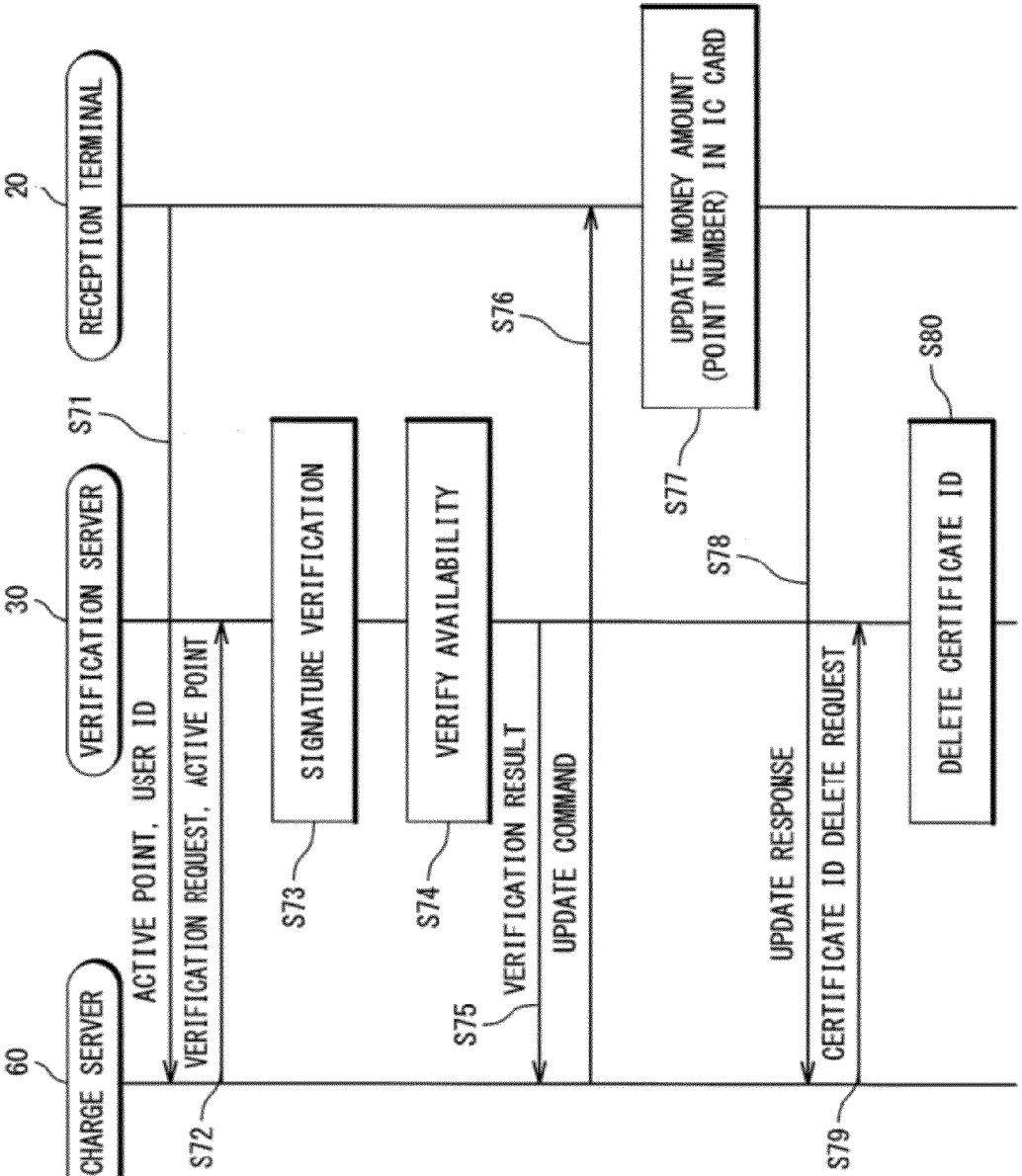
FIG. 19 is a sequence diagram showing one example of an operation of the deposit process of the active electronic money in the electronic money system according to the present invention.

Referring to FIG. 19, an operation of the deposit process to the IC card will be explained.

In order to deposit the retained active electronic money 600A, the reception terminal 20 is connected to the charge server 60 via the carrier network 100 and the internet 400.

(1) Step S71

The reception terminal 20 issues the settlement request to the charge server 60, and sends the active electronic money 600A and the user ID 95.

(2) Step S72

In response to the settlement request, the charge server 60 issues the verification request of the active electronic money 600A to the verification server 30, and sends the active electronic money 600A to be verified.

(3) Step S73

The verification server 30 executes the signature verification in the same manner as that of step S32.

(4) Step S74

The verification server 30 executes the verification of the availability in the same manner as that of step S33.

(5) Step S75

The charge server 60 receives the verification result from the verification server 30.

(6) Step S76

The charge server 60 executes the deposit process to the IC card 80 on the basis of the received verification result. Here, the charge server 60 issues an update command to the IC card 80 corresponding to the sent user ID 95, and deposits the money amount 611A written in the active electronic money 600A to the IC card 80 through the transaction process.

(7) Step S77

In response to the update command from the charge server 60, the reception terminal 20 having the IC card 80 updates the money amount (the point number) inside the IC card 80.

(8) Step S78

Upon completion of the deposit from the charge server 60, the reception terminal 20 issues an update response to the charge server 60.

(9) Step S79

In response to the update response, the charge server 60 issues the delete request of the certificate ID to the verification server 30.

(10) Step S80

In response to the delete request, the verification server 30 deletes the certificate ID from the certificate ID database (the certificate ID D/B) 38.

Upon issuing the delete request, the charge server 60 issues the settlement response to the settlement request to the reception terminal 20, and thus the deposit process ends.

Here, a form where the settlement request is issued from the reception terminal 20 to the charge server 60 in the deposit process has been explained, but the settlement request may be issued to the charge server 60 via the verification server 30.

As described above, at the time when the active electronic money 600A is deposited into own account or the IC card, the certification ID inside the verification server 30 is erased. For example, in the case where the active electronic money 600A has been twice used, namely, a plurality of the electronic money having the identical certificate ID have been illegally used, the active electronic money 600A firstly requiring the settlement request is deposited, but the deposit of the following settlement request is refused because the certificate ID is not registered. In this manner, the electronic money system according to the present invention can prevent the electronic money from being illegally used.

In the present embodiment, the case where the remittance terminal 10 and the reception terminal 20 use the same carrier network has been explained, but the remittance to the reception terminal 20 using another network can be executed in the same manner.

In this case, the reception terminal 20 issues the settlement request together with the active electronic money 600A to the verification server 30 provided to the carrier network 100 on a side of the remittance terminal 10. The verification server 30 verifies the active electronic money, and in the case of the acceptance, deposits the money amount 611A to the electronic money account on a side of the reception terminal 20 through the transaction process.

On this occasion, it is desirable that the verification server 30 and the electronic money account on the side of the reception terminal 20 are connected each other with a dedicated line having a secret. As described above, the deposit can be realized to another carrier network after the verification by the verification server 30.

2. Second Embodiment

Figure 20:
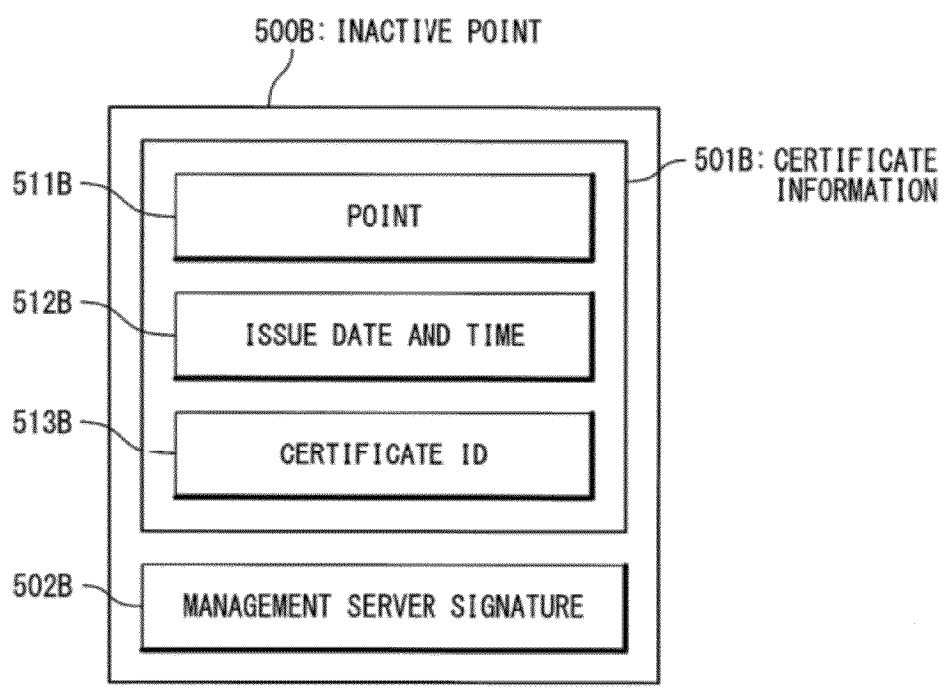
FIG. 20 is a view showing a configuration of an inactive point in the electronic money system according to the present invention.
Figure 21:
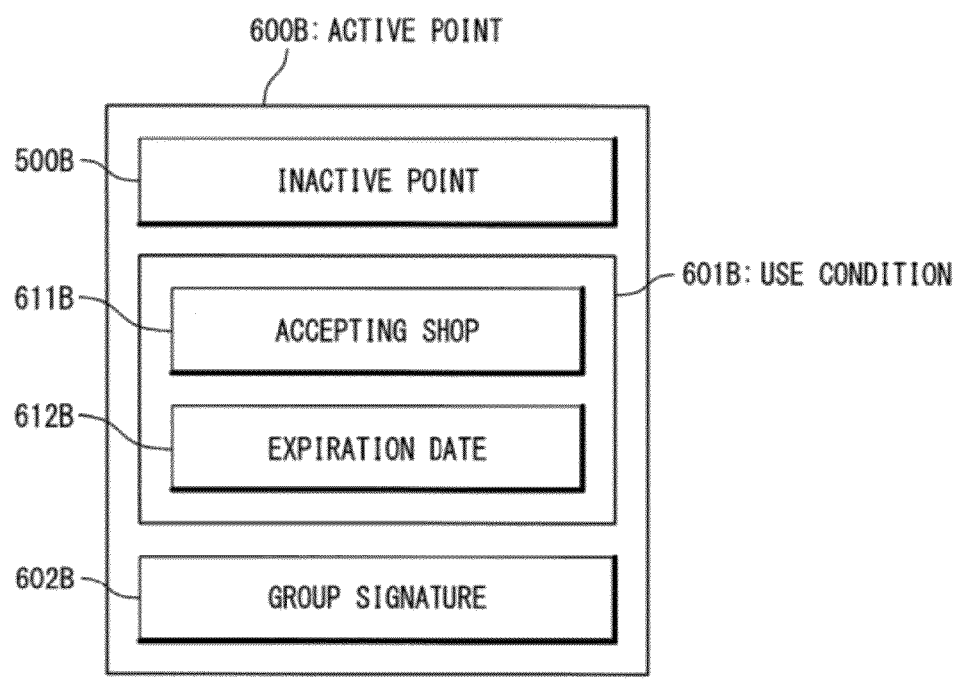
FIG. 21 is a view showing a configuration of an active point in the electronic money system according to the present invention.

Referring to FIGS. 20 and 21, a second embodiment of the electronic money system according to the present invention will be explained. In the second embodiment, the electric money system using the electronic money issued by the management server 40 as company currency (for example, a point, a gift certificate, and a ticket) will be explained. The following explanation will be made by adding same numerals to components same as those of the first embodiment. In addition, the explanation of a same configuration as that of the first embodiment will be omitted, and explain only different points.

The remittance terminal 10 in the second embodiment is applied to a corporation server and the like, and issues the electronic money issued by the carrier to a user (the reception terminal 20). On this occasion, the corporation adds a use condition to the electronic money issued by the carrier (an inactive point 500B), and uses the money as company-specific company currency (an active point 600B).

In this manner, a user can use the company-specific company currency issued from a plurality of companies, and can deposit these company currencies into a common account (the electronic money account database (the electronic money account D/B) 51 managed by the carrier). For example, the user can save the company currency issued by different companies as the electronic money issued by the carrier (normally, a point provided in accordance with a use amount of communication by a subscriber). In this case, the corporation can take the subscriber of the carrier network 100 as a customer.

Referring to FIGS. 20 and 21, the company currency issued by the remittance terminal 10 to the reception terminal 20 will be explained. Here, the management server 40 issues the inactive point 500B shown in FIG. 20 in place of the inactive electronic money 500A of the first embodiment, and the remittance terminal 10 enables the inactive point 500B to generate the active point 600B shown in FIG. 21.

FIG. 20 is one example of the inactive point issued by the management server 40.

The remittance terminal 10 issues to the management server 40 an issue request of the electronic money that designates the number of points. In response to the issue request of the electronic money, the management server 40 generates the inactive point 500B.

Referring to FIG. 20, the inactive point 5008 includes a piece of certificate information 500B and a management server signature 5028. The certificate information 501B includes the number of points 511B, an issue date and time 512B, and a certificate ID 513B.

The management server 40 gives the management server signature 502B to the certificate information 501B including the designated number of points 511B, the issue date and time 512B, and the certificate ID 513B by using the management server secret key 92, and generates the inactive point 500B. Here, the issue date and time 512B may be only a standard character string in a prescribed format or may be a timestamp that guarantees a generation time of the certificate information 501B with accurate time information.

It is desirable that the management server 40 in the second embodiment retains a point database is point D/B) for managing available points in each company (the remittance terminal 10) in place of the credit balance database (the credit balance D/B) 50. To the point database (the point D/B), the number of points available for the company contracting with the carrier is set. The number of points 511B is subtracted from the point database (the point D/B) corresponding to the remittance terminal 10 that is an issue target in issuing the inactive point 500B.

The company managing the remittance terminal 10 pays value based on the number of used points to the carrier periodically or at an arbitrary period, and can recover a use limitation of the number in the point database (the point D/B). Here, it is desirable that the point used for the inactive point 500B is a point provided to the subscriber in accordance with a use amount of the carrier network 100.

FIG. 21 is one example of the active point 600B enabled by the remittance terminal 10. The remittance terminal 10 generates the active electric point 600B acting as the currency on the basis of the inactive electric point 500B as the electric certificate.

The electronic certificate enabling part 173 of the remittance terminal 10 gives the group signature 602B to information (a message) that adds the use condition 601B to the inactive electronic point 500B by using the member key 94, and generates the active electronic point 600B as shown in FIG. 21.

The information set as the use condition 601B is the information regarding a shop accepting the active electronic point 600B (an accepting shop 611B) or the expiration date 612B used for determining an available period of the active electronic money 600A. In addition, an address of the verification server 30 that is a verification destination of the active electronic point 600B may be included. A currency value of the active point 600B is determined by the number of points 511B. Moreover, as a condition set to the use condition 601B, a condition to limit the use of the electronic money (information regarding a commodity and service exchangeable for the active electronic point) different from the shop information 611B and the expiration date 612B may be added to the use condition 601A.

After verifying the signature of the active electronic point 6008 issued from the remittance 10, the remittance terminal 20 uses the point by sending (remitting) it to another reception terminal 20. The another reception terminal 20 verifies the management server signature 502B and the group signature 602B of the active electronic point 600B, and verifies whether or not the point is adapted to the use condition 601A. Here, it is verified whether or not the shop information 602B includes oneself and it is verified whether or not the expiration date 6128 has been passed.

Additionally, the verification server 30 may be requested to verify the availability of the active electronic point 600B. In this case, it is desirable that the information used for identifying the accepting shop is registered to the verification server 30. The verification server 30 matches the shop information 611B included in the active electronic point 600B that is a verification target with the shop information notified from a verification request source to judge the availability of the active electronic point 600B.

In the same manner as that of the above-mentioned settlement process, the reception terminal 20 deposits the obtained active electronic point 600B into the electronic money account database (the electronic money account D/B) 51 of the management server 40. On this occasion, the management server 40 deposits an amount (the number of points) equivalent to the number of points 611B of the active point 600B that is a deposit target into the electronic money account of the reception terminal 20.

For example, in a case where the remittance terminal 10 is a POS (Point of Sales) terminal and a company using the POS terminal is registered in the management server 40 as one group, the management server 40 can trace what kind of point has been issued by which POS terminal of which shop. In addition, when obtaining a state of the point issue of the POS terminal registered in the group from the management server 40, the company can obtain information contributing to the company management and the market research. Moreover, since the secret of the POS terminal to the reception terminal 20 is kept by the group signature, the reception terminal 20 (a customer who obtained the point) cannot know which POS terminal issued the point.

In the present invention, the signature to the active electronic point 600B is carried out by using the member key 95 unique to the POS terminal. For this reason, in a case where the member key 95 is leaked, only the member key 95 of the POS terminal has to be updated and the member key 95 of another POS terminal does not have to be updated. In addition, since the issuer of the illegally-used active electronic point 600B is traced in the management server 40, the POS terminal that is the leakage source of the member key 95 can be specified. Moreover, a terminal other than the terminal that retains the cryptogram group secret key 90B (here, the verification server 30) is not able to obtain the information regarding the POS terminal that enabled the active electronic point 600B from the active electronic point 600B. Thus, the masquerading of the POS terminal can be prevented.

The above-mentioned effect has been explained using the POS terminal as one example, but it is obvious that the example is not limited to this. In addition, it is obvious that a same effect also can be obtained in the first embodiment.

According to the electronic money system of the present invention, the electronic money account database (the electronic money account D/B) 51, for example, is applied to a billing system of the carrier, the electronic money and the electronic points deposited in the electronic money account database (the electronic money account D/B) 51 can be used as the whole of or a part of the communication fee to the user.

In addition, the electronic money and the electronic points deposited in the electronic money account database (the electronic money account D/B) 51 also can be deposited to a bank that is not shown in the drawing (conversion into money). In this case, there are the settlement carried out with a designated user's financial institution periodically such as monthly by the carrier, the debit settlement carried out with the designated user's financial institution, and the settlement by prepaid electronic money designated by the user, and the like. Moreover, the electronic money in the electronic money account database (the electronic money account D/B) 51 also can be moved to another credit account.

Furthermore, it is desirable that the management server 40 and the verification server 30 according to the present invention are managed by the Carrier. When the highly-reliable carrier unifies the management of the issuing institution and the verification institution of the electronic money, the reliability of the electronic money is improved compared to the management by a plurality of the companies. In addition, the carrier manages the subscriber information with a high secret used for identifying the terminal. When the remittance terminal 10 is managed by using this as the user ID 95, the secret kept by the group signature can be firmly maintained.

As described-above, since employing the group signature as a signature to enabling the electronic money and the electronic point, the electronic money system according to the present invention is able to prevent the terminal information (the personal information) between the terminals for trading the electronic money and the electronic point from being leaked, and to link the issued electronic money and electrical point to the terminal (the remittance terminal 10) of the issuer or its remitter to manage them. In addition, the verification server 30 judges the availability of the electronic money on the basis of the certificate ID of the currently-circulating electronic money. Accordingly, an information amount used for the availability judgment can be reduced than ever.

As described above, the embodiments of the present invention have been described in detail, but a concrete configuration is not limited to each of the above-mentioned embodiments and included in the present invention if modified without departing from the scope of the invention. The terminal that handles the electronic money according to the present invention may have both functions of the remittance terminal 10 and the reception terminal 20. In addition, the management server secret key 92 may be identical to the signature group secret key 90A, and the management server public key 93 may be identical to the signature group public key 91B. In this case, a part of efforts to manage the keys and to verify the electronic certificate can be saved. Moreover, each of the above-mentioned embodiments can be carried out in combination with each other.

Furthermore, the remittance terminal 10 may copy the active electronic money 600A and send the money to a plurality of the reception terminal 20. In this case, only the reception terminal 20 that firstly verified the active electronic money 600A in the verification server 30 can use the active electronic money 600A among a plurality of the reception terminals 20.

For example, in a case where the user having the remittance terminal 10 goes the internet shopping by using the reception terminal 20 installed in a plurality of rooms of own house, the user can go shopping in the desired room without restricted to the specific reception terminal 600A when the active electronic money 600A has been send to all of the reception terminal 20. In this case, the active electronic money 600A stored in the reception terminal 20 other than the reception terminal 20 used for the shopping turns to be unavailable because the money is not authorized in the authorization server 30.

Immediately after obtaining the active electronic money 600A, the reception terminal 20 is generally verified regarding the availability in the verification server 30 and notifies the remittance terminal 10 of the completion of reception or failure of reception of the active electronic money 600A on the basis of the result.

However, among the users of the reception terminal 20, there are some persons who tell untruth; the person is notified from the verification server 30 that the money is available but cannot obtain the active electronic money 600A. In such case, if the remittance terminal 10 copies the active electronic money 600A before the remittance and the copied active electronic money 600A is verified in the verification server 30 after receiving the notification of the failure of reception, the untruth of the reception terminal 20 can be detected.

For example, in the case where the money is determined to be available in the verification based on a request from the remittance terminal 10, it can be known that the reception terminal 20 did not verify the active electronic money 600A in the verification server 30 or could not verify it.

In the case of the former, a possibility that the reception terminal 20 received the active electronic money 600A but poses the completion of the verification can be considered.

In the case of the latter, a possibility that the terminal could not correctly receive the active electronic money 600A can be considered.

However, in both cases, since the remitted active electronic money 600A becomes unavailable because of the verification by the remittance terminal 10, the failure of reception can be eliminated preventing the twice remittance if the active electronic money 600A having the new certificate ID 513A is remitted to the reception terminal 20.

In addition, in the case where the money is determined to be unavailable in the verification based on a request from the remittance terminal 10, it is known that the active electronic money 600A has already verified in the verification server 30. In this case, two cases can be considered; one case where the reception terminal 20 received the notification representing an available state in the verification reported untruth, that is the unavailable state, and the other one where the money was illegally used by another terminal. It can be specified which terminal illegally used the active electronic money 600A in the management server 40 by using the used ID extracted from the certificate ID data base (the certificate ID D/B) 38 in the verification server 30.

Features of an electronic money transaction system of the present invention will be explained.

The electronic money transaction system of the present invention includes a management server, a verification server, a remittance terminal, and a reception terminal. In response to a request from the remittance terminal, the management server issues an inactive electronic certificate including a certificate ID and notifies the verification server of the certificate ID. The remittance terminal gives a group signature to the inactive electronic certificate to generate an active electronic certificate. The reception terminal verifies the active electronic certificate obtained from the remittance terminal on the basis of the group signature. The verification server matches the certificate ID notified from the management server with the certificate ID included in the active electronic certificate verified by the reception terminal, and verifies availability of the active electronic certificate.

In a case of determining the active electronic certificate to be available, the management server updates a balance of an account corresponding to the reception terminal on the basis of a money amount shown by the active electronic certificate.

The verification server records the certificate ID notified from the management server in a certificate ID database. In a case where the certificate ID included in the active electronic certificate is not recorded in the certificate ID database, the verification server limits use of the active electronic certificate.

The verification server deletes the certificate ID recorded in the certificate ID database in accordance with update of the account.

The reception terminal issues a lock request for the active electronic certificate retained therein. The verification server limits the use of the active electronic certificate in response to the lock request.

The reception terminal issues a refresh request for the active electronic certificate retained therein. In response to the refresh request, the management server changes the certificate ID of the active electronic certificate and notifies the verification server of the changed certificate ID.

The management server correlates the certificate ID of the inactive electronic certificate to the remittance terminal which is an issue destination of the inactive electronic certificate and records the certificate ID of the inactive electronic certificate.

The management server gives the management server signature to certificate information including the certificate ID by using the management server secret key. The remittance terminal verifies the management server signature by using the management server public key obtained from the management server.

The remittance terminal sets a use condition of the active electronic certificate. The verification server verifies the availability of the active electronic certificate on the basis of the use condition.

The use condition is an expiration date until when the active electronic certificate is available.

The remittance terminal designates a use limit amount of the inactive electronic certificate. The management server sets the use limit amount to the inactive electronic certificate. The management server updates a credit balance of the remittance terminal on the basis of the use limit amount.

The remittance terminal designates the number of points for determining the value of the inactive electronic certificate. The management server sets the number of points to the inactive electronic certificate and updates a remaining amount of points of the remittance terminal on the basis of the number of points.

Features of an electronic money transaction method according to the present invention will be explained.

The electronic money transaction method of the present invention includes: a step of issuing an inactive electronic certificate including a certificate ID in response to a request for remittance; a step of giving a group signature to the inactive electronic certificate and generating an active electronic certificate; and a step of verifying the active electronic certificate on the basis of the group signature, and further includes: a step of matching the certificate ID included in the inactive electronic certificate with the certificate ID included in the active electronic certificate and verifying availability of the active electronic certificate.

In a case of determining the active electronic certificate to be available, the electronic money transaction method according to the present invention further includes: a step of updating a balance of an account corresponding to the reception side on the basis of a money amount indicated by the active electronic certificate.

The electronic money transaction method according to the present invention further includes: a step of recording the certificate ID included in the inactive electronic certificate in a certificate ID database; and a step of limiting use of the active electronic certificate in a case where the certificate ID included in the active electronic certificate is not recorded in the certificate ID database.

The electronic money transaction method according to the present invention further includes: a step of erasing the certificate ID recorded in the certificate ID database in accordance with update of the account.

The electronic money transaction method according to the present invention further includes: a step of issuing a lock request for the active electronic certificate; and a step of limiting the use of the active electronic certificate in accordance with the lock request.

The electronic money transaction method according to the present invention further includes: a step of issuing a refresh request for the active electronic certificate; and a step of changing the certificate ID of the active electronic certificate in accordance with the refresh request.

The electronic money transaction method according to the present invention further includes: a step of relating the certificate ID of the inactive electronic certificate to the issue destination of the inactive electronic certificate and recording them.

The electronic money transaction method according to the present invention further includes: a step of giving the management server signature to the certificate information including the certificate ID by using the management secret key; and a step of verifying the management server signature by using the management public key.

The electronic money transaction method according to the present invention further includes: a step of setting a use condition of the active electronic certificate; and a step of verifying the availability of the active electronic certificate on the basis of the use condition.

The use condition is an expiration date when the active electronic certificate is available.

The electronic money transaction method according to the present invention further includes: a step of designating a use limit amount of the inactive electronic certificate; a step of setting the use limit amount to the inactive electronic certificate; and a step of updating a credit balance of the remitter on the basis of the use limit amount.

The electronic money transaction method according to the present invention further includes: a step of designating the number of points for determining value of the inactive electronic certificate; a step of setting the number of points to the inactive electronic certificate; and a step of updating a remaining amount of points of the remitter on the basis of the number of points.

As described above, referring to the embodiments, the present invention is not limited to the above-mentioned embodiments. Various modifications that can be understood by a person skilled in the art can be applied to the configurations and details of the present invention within the scope of the present invention.

What is claimed is:

1. An electronic money transaction system, comprising:
a management server;
a verification server;
a remittance terminal; and
a reception terminal,
wherein, in response to a request from said remittance terminal, said management server issues an inactive electronic certificate to which a use limit amount is set and notifies said verification server of a certificate ID included in said inactive electronic certificate,
wherein said remittance terminal obtains said inactive electronic certificate from said management server and generates an active electronic certificate usable for settlement through allocating a money amount equal to or less than said use limit amount to said inactive electronic certificate and activating said inactive electronic certificate by giving a group signature,
wherein said reception terminal verifies said active electronic certificate obtained from said remittance terminal based on said group signature,
wherein said verification server matches the certificate ID notified from said management server with the certificate ID included in the active electronic certificate verified by said reception terminal to verify availability of said active electronic certificate,
wherein the remittance terminal is preliminarily registered in a group, obtains a member key unique to the remittance terminal and carries out said group signature by using the member key,
wherein the reception terminal verifies said group signature by using a group public key preliminarily obtained from the management server, and
wherein at least one of the management server, the verification server, the remittance terminal, and the reception terminal is implemented using a computer.

2. The electronic money system according to claim 1, wherein said management server records a balance of an electronic money account of said reception terminal onto an electronic money account database, and updates the balance of the electronic money account of said reception terminal based on a money amount indicated in the active electronic certificate.

3. An electronic money transaction system, comprising:
a management server;
a verification server;
a remittance terminal; and
a reception terminal,
wherein, in response to a request from said remittance terminal, said management server issues an inactive electronic certificate to which a use limit amount is set and notifies said verification server of a certificate ID included in said inactive electronic certificate,
wherein said remittance terminal obtains said inactive electronic certificate from said management server and generates an active electronic certificate usable for settlement through allocating a money amount equal to or less than said use limit amount to said inactive electronic certificate and activating said inactive electronic certificate by giving a group signature,
wherein said reception terminal verifies said active electronic certificate obtained from said remittance terminal based on said group signature,
wherein said verification server matches the certificate ID notified from said management server with the certificate ID included in the active electronic certificate verified by said reception terminal to verify availability of said active electronic certificate,
wherein said management server records a balance of an electronic money account of said reception terminal onto an electronic money account database, and updates the balance of the electronic money account of said reception terminal based on a money amount indicated in the active electronic certificate,
wherein said verification server records the certificate ID notified from said management server in a certificate ID database, and limits use of said active electronic certificate, when the certificate ID included in the active electronic certificate for which verification is requested is not recorded in said certificate ID database, and
wherein at least one of the management server, the verification server, the remittance terminal, and the reception terminal is implemented using a computer.

4. The electronic money system according to claim 3, wherein said verification server deletes the certificate ID recorded in said certificate ID database in response to update of said account database.

5. An electronic money transaction system, comprising:
a management server;
a verification server;
a remittance terminal; and
a reception terminal,
wherein, in response to a request from said remittance terminal, said management server issues an inactive electronic certificate to which a use limit at is set and notifies said verification server of a certificate ID included in said inactive electronic certificate,
wherein said remittance terminal obtains said inactive electronic certificate from said management server and generates an active electronic certificate usable for settlement through allocating a money amount equal to or less than said use limit amount to said inactive electronic certificate and activating said inactive electronic certificate by giving a group signature,
wherein said reception terminal verifies said active electronic certificate obtained from said remittance terminal based on said group signature,
wherein said verification server matches the certificate ID notified from said management server with the certificate ID included in the active electronic certificate verified by said reception terminal to verify availability of said active electronic certificate,
wherein said reception terminal issues a lock request for the active electronic certificate retained therein,
wherein said verification server limits use of said active electronic certificate in response to said lock request, and
wherein at least one of the management server, the verification server, the remittance terminal, and the reception terminal is implemented using a computer.

6. An electronic money transaction system, comprising:
a management server;
a verification server;
a remittance terminal; and
a reception terminal,
wherein, in response to a request from said remittance terminal, said management server issues an inactive electronic certificate to which a use limit amount is set and notifies said verification server of a certificate ID included in said inactive electronic certificate, wherein said remittance terminal obtains said inactive electronic certificate from said management server a generates an active electronic certificate usable for settlement through allocating a money amount equal to or less than said use limit amount to said inactive electronic certificate and activating said inactive electronic certificate by giving a group signature, wherein said reception terminal verifies said active electronic certificate obtained from said remittance terminal based on said group signature, wherein said verification server matches the certificate ID notified from said management server with the certificate ID included in the active electronic certificate verified by said reception terminal to verify availability of said active electronic certificate, wherein said reception terminal issues a refresh request for the active electronic certificate retained therein, wherein, in response to the refresh request, said management server changes the certificate ID of said active electronic certificate and notifies said verification server of the changed certificate ID, and wherein at least one of the management server, the verification server, the remittance terminal, and the reception terminal is implemented using a computer.

7. An electronic money transaction system, comprising:
a management server;
a verification server;
a remittance terminal; and
a reception terminal,
wherein, in response to a request from said remittance terminal, said management server issues an inactive electronic certificate to which a use limit amount is set and notifies said verification server of a certificate ID included in said inactive electronic certificate, wherein said remittance terminal obtains said inactive electronic certificate from said management server and generates an active electronic certificate usable for settlement through allocating a money amount equal to or less than said use limit amount to said inactive electronic certificate and activating said inactive electronic certificate by giving a group signature, wherein said reception terminal verifies said active electronic certificate obtained from said remittance terminal based on said group signature, wherein said verification server matches the certificate ID notified from said management server with the certificate ID included in the active electronic certificate verified by said reception terminal to verify availability of said active electronic certificate, wherein said management server records the certificate ID of said inactive electronic certificate into said certificate ID database with the certificate ID of the inactive electronic certificate correlated to said remittance terminal which is an issue destination of said inactive electronic certificate, and wherein at least one of the management server, the verification server, the remittance terminal, and the reception terminal is implemented using a computer.

8. An electronic money transaction system, comprising:
a management server;
a verification server;
a remittance terminal; and
a reception terminal,
wherein, in response to a request from said remittance terminal, said management server issues an active electronic certificate to which a use limit amount is set and notifies said verification server of a certificate ID included in said inactive electronic certificate, wherein said remittance terminal obtains said inactive electronic certificate from said management server and generates an active electronic certificate usable for settlement through allocating a money amount equal to or less than said use limit amount to said inactive electronic certificate and activating said inactive electronic certificate by giving a group signature, wherein said reception terminal verifies said active electronic certificate obtained from said remittance terminal based on said group signature, wherein said verification server matches the certificate ID notified from said management server with the certificate ID included in the active electronic certificate verified by said reception terminal to verify availability of said active electronic certificate, wherein said management server generates said inactive electronic certificate by giving a management signature to certificate information including said certificate ID by using the management secret key, and wherein said remittance terminal verifies said management signature by using a management public key obtained from said management server, and wherein at least one of the management server, the verification server, the remittance terminal, and the reception terminal is implemented using a computer.

9. An electronic money transaction system, comprising:
a management server;
a verification server;
a remittance terminal; and
a reception terminal,
wherein, in response to a request from said remittance terminal, said management server issues an inactive electronic certificate to which a use limit amount is set and notifies said verification server of a certificate included in said inactive electronic certificate, wherein said remittance terminal obtains said inactive electronic certificate from said management server and generates an active electronic certificate usable for settlement through allocating a money amount equal to or less than said use limit amount to said inactive electronic certificate and activating said inactive electronic certificate by giving a group signature, wherein said reception terminal verifies said active electronic certificate obtained from said remittance terminal based on said group signature, wherein said verification server matches the certificate ID notified from said management server with the certificate ID included in the active electronic certificate verified by said reception terminal to verify availability of said active electronic certificate, wherein said remittance terminal sets a use condition of said active electronic certificate, and wherein said verification server verifies availability of said active electronic certificate based on said use condition, and wherein at least one of the management server, the verification server, the remittance terminal, and the reception terminal is implemented using a computer.

10. The electronic money system according to claim 9, wherein said use condition is an expiration date until when said active electronic certificate is available.

11. An electronic money transaction system, comprising:
a management server;
a verification server;
a remittance terminal; and a reception terminal, wherein, in response to a request from said remittance terminal, said management server issues an inactive electronic certificate to which a use limit amount is set and notifies said verification server of a certificate included in said inactive electronic certificate, wherein said remittance terminal obtains said inactive electronic certificate from said management server and generates an active electronic certificate usable for settlement through allocating a money amount equal to or less than said use limit amount to said inactive electronic certificate and activating said inactive electronic certificate by giving a group signature, wherein said reception terminal verifies said active electronic certificate obtained from said remittance terminal based on said group signature, wherein said verification server matches the certificate ID notified from said management server with the certificate ID included in the active electronic certificate verified by said reception terminal to verify availability of said active electronic certificate, wherein said management server records a credit balance of said remittance terminal in a credit balance database, wherein said remittance terminal issues an electronic money request designating said use limit amount to said management server, wherein said management server sets said use limit amount to said inactive electronic certificate, and updates the credit balance of said remittance based on said use limit amount, and wherein at least one of the management server, the verification server, the remittance terminal, and the reception terminal is implemented using a computer.

12. An electronic money transaction system, comprising:
a management server;
a verification server;
a remittance terminal; and
a reception terminal, wherein, in response to a request from said remittance terminal, said management server issues an inactive electronic certificate to which a use limit amount is set and notifies said verification server of a certificate ID included in said inactive electronic certificate, wherein said remittance terminal obtains said inactive electronic certificate from said management server and generates an active electronic certificate usable for settlement through allocating a money amount equal to or less than said use limit amount to said inactive electronic certificate and activating said inactive electronic certificate by giving a group signature, wherein said reception terminal verifies said active electronic certificate obtained from said remittance terminal based on said group signature, wherein said verification server matches the certificate ID notified from said management server with the certificate ID included iii the active electronic certificate verified by said reception terminal to verify availability of said active electronic certificate, wherein said management server records a remaining point amount indicative of an available number of points of said remittance terminal, wherein said remittance terminal designates a number of points for determining a value of said inactive electronic certificate, wherein said management server sets said number of points to said inactive electronic certificate and updates the remaining point amount of said remittance terminal based on said number of points, and wherein at least one of the management server, the verification server, the remittance terminal, and the reception terminal is implemented using a computer.

13. An electronic money transaction system, comprising:
a management server;
a verification server;
a remittance terminal; and,
a reception terminal, wherein, in response to a request from said remittance terminal, said management server issues an inactive electronic certificate to which a use limit amount is set and notifies said verification server of a certificate ID included in said inactive electronic certificate, wherein said remittance terminal obtains said inactive electronic certificate from said management server and generates an active electronic certificate usable for settlement through allocating a money amount equal to or less than said use limit amount to said inactive electronic certificate and activating said inactive electronic certificate by giving a group signature, wherein said reception terminal verifies said active electronic certificate obtained from said remittance terminal based on said group signature, wherein said verification server matches the certificate ID notified from said management server with the certificate ID included in the active electronic certificate verified by said reception terminal to verify availability of said active electronic certificate, wherein said remittance terminal and said reception terminal are connected through a near field communication link, wherein said remittance terminal sends said active electronic certificate to said reception terminal through said near field communication link, and wherein at least one of the management server the verification server, the remittance terminal, and the reception terminal is implemented using a computer.

14. An electronic money transaction method, comprising:
a management server issuing an inactive electronic certificate to which a use limit amount is set in response to a request of a remittance terminal, and notifying a verification server of a certificate ID included in said inactive electronic certificate;

said remittance terminal obtaining said inactive electronic certificate from said management server and generating an active electronic certificate usable for settlement through allocating a money amount equal to or less than said use limit amount and activating said inactive electronic certificate by giving a group signature;

a reception terminal obtaining said active electronic certificate from said remittance terminal and verifying said group signature; and said verification server matching the certificate ID informed from said management server with the certificate ID included in said active electronic certificate to verify availability of said active electronic certificate, wherein the remittance terminal is preliminarily registered in a group, obtains a member key unique to the remittance terminal and carries out said group signature by using the member key, wherein the reception terminal verifies said group signature by using a group public key preliminarily obtained from the management server, and wherein at least one of the management server, the verification server, the remittance terminal, and the reception terminal is implemented using a computer.

15. The electronic money transaction method according to claim 14, further comprising:
updating a balance of an account of a reception side based on a money amount indicated by said active electronic certificate, when said active electronic certificate is determined as being available.

16. An electronic money transaction method, comprising:
a management server issuing an inactive electronic certificate to which a use limit amount is set in response to a request of a remittance terminal, and notifying a verification server of a certificate ID included in said inactive electronic certificate;
said remittance terminal obtaining said inactive electronic certificate from said management server and generating an active electronic certificate usable for settlement through allocating a money amount equal nor less than said use limit amount and activating said inactive electronic certificate by riving a group signature;
a reception terminal obtaining said active electronic certificate from said remittance terminal and verifying said group signature;
said verification server matching the certificate ID informed from said management server with the certificate ID included in said active electronic certificate to verify availability of said active electronic certificate;
recording the certificate ID included in said inactive electronic certificate in a certificate ID database; and
limiting use of said active electronic certificate when the certificate ID included in said active electronic certificate is not recorded in said certificate ID database,
wherein at least one of the management server, the verification server, the remittance terminal, and the reception terminal is implemented using a computer.

17. The electronic money transaction method according to claim 16, further comprising:
deleting the certificate ID recorded in the certificate ID database in response to update of the account.

18. An electronic money transaction method, comprising:
a management server issuing an inactive electronic certificate to which a use limit amount is set in response to a request of a remittance terminal, and notifying a verification server of a certificate ID included in said inactive electronic certificate;
said remittance terminal obtaining said inactive electronic certificate from said management server and generating an active electronic certificate usable for settlement through allocating a money amount equal to or less than said use limit amount and activating said inactive electronic certificate by giving a group signature;
a reception terminal obtaining said active electronic certificate from said remittance terminal and verifying said group signature;
said verification server matching the certificate ID informed from said management server with the certificate ID included in said active electronic certificate to verify availability of said active electronic certificate;
issuing a lock request for said active electronic certificate; and
limiting the use of the active electronic certificate in accordance with the lock request,
wherein at least one of the management server, the verification server, the remittance terminal, and the reception terminal is implemented using a computer.

19. An electronic money transaction method, comprising:
a management server issuing an inactive electronic certificate to which a use limit amount is set in response to a request of a remittance terminal, and notifying a verification server of a certificate ID included in said inactive electronic certificate;
said remittance terminal obtaining said inactive electronic certificate from said management server and generating an active electronic certificate usable for settlement through allocating a money amount equal to or less than said use limit amount and activating said inactive electronic certificate by giving a group signature;
a reception terminal obtaining said active electronic certificate from said remittance terminal and verifying said group signature;
said verification server matching the certificate ID informed from said management server with the certificate ID included in said active electronic certificate to verify availability of said active electronic certificate;
issuing a refresh request for said active electronic certificate; and
changing the certificate ID of said active electronic certificate in response to said refresh request,
wherein at least one of the management server, the verification server, the remittance terminal, and the reception terminal is implemented using a computer.

20. An electronic money transaction method, comprising:
a management server issuing an inactive electronic certificate to which a use limit amount is set in response to a request of a remittance terminal, and notifying a verification server of a certificate ID included in said inactive electronic certificate;
said remittance terminal obtaining said inactive electronic certificate from said management server and genera an active electronic certificate usable for settlement through allocating a money amount equal to or less than said use limit amount and activating said inactive electronic certificate by giving a group signature;
a reception terminal obtaining said active electronic certificate from said remittance terminal and verifying said group signature;
said verification server matching the certificate ID informed from said management server with the certificate ID included in said active electronic certificate to verify availability of said active electronic certificate;
recording the certificate ID of said inactive electronic certificate with the certificate ID of said inactive electronic certificate correlated to an issue destination of said inactive electronic certificate,
wherein at least one of the management server, the verification server, the remittance terminal, and the reception terminal is implemented using a computer.

21. An electronic money transaction method, comprising:
a management server issuing an inactive electronic certificate to which a use limit amount is set in response to a request of a remittance terminal; and notifying a verification server of a certificate ID included in said inactive electronic certificate;
said remittance terminal obtaining said inactive electronic certificate from said management server and generating an active electronic certificate usable for settlement through allocating a money amount equal to or less than said use limit amount and activating said inactive electronic certificate by giving a group signature;
a reception terminal obtaining said active electronic certificate from said remittance terminal and verifying said group signature;

said verification server matching the certificate ID informed from said management server with the certificate ID included in said active electronic certificate to verify availability of said active electronic certificate;

giving a management signature to certificate information including the certificate ID by using a management secret key; and verifying said management signature by using a management public key, wherein at least one of the management server, the verification server, the remittance terminal, and the reception terminal is implemented using a computer.

22. An electronic money transaction method, comprising:

a management server issuing an inactive electronic certificate to which a use limit amount is set in response to a request of a remittance terminal, and notifying a verification server of a certificate ID included in said inactive electronic certificate;

said remittance terminal obtaining said inactive electronic certificate from said management server and generating an active electronic certificate usable for settlement through allocating a money amount equal to or less than said use limit amount and activating said inactive electronic certificate by giving a group signature;

a reception terminal obtaining said active electronic certificate from said remittance terminal and verifying said group signature;

said verification server matching the certificate ID informed from said management server with the certificate ID included in said active electronic certificate to verify availability of said active electronic certificate;

setting a use condition of said active electronic certificate; and verifying the availability of said active electronic certificate based on said use condition, wherein at least one of the management server, the verification server, the remittance terminal, and the reception terminal is implemented using a computer.

23. The electronic money transaction method according to claim 22, wherein said use condition is an expiration date until when said active electronic certificate is available.

24. An electronic money transaction method, comprising:

a management server issuing an inactive electronic certificate to which a use limit amount is set in response to a request of a remittance terminal, and notifying a verification server of a certificate ID included in said inactive electronic certificate;

said remittance terminal obtaining said inactive electronic certificate from said management server and generating an active electronic certificate usable for settlement through allocating a money amount equal to or less than said use limit amount and activating said inactive electronic certificate by giving a group signature;

a reception terminal obtaining said active electronic certificate from said remittance terminal and verifying said group signature;

said verification server matching the certificate ID informed from said management server with the certificate ID included in said active electronic certificate to verify availability of said active electronic certificate;

said remittance terminal issuing an electronic money request designating said use limit amount to said management means;

said management server setting said use limit amount to said inactive electronic certificate; and said management server updating a credit balance of a remitter based on said use limit amount, wherein at least one of the management server, the verification server, the remittance terminal, and the reception terminal is implemented using a computer.

25. An electronic money transaction method, comprising:

a management server issuing an inactive electronic certificate to which a use limit amount is set in response to a request of a remittance terminal, and notifying a verification server of a certificate ID included in said inactive electronic certificate;

said remittance terminal obtaining said inactive electronic certificate from said management server and generating an active electronic certificate usable for settlement through allocating a money amount equal to or less than said use limit amount and activating said inactive electronic certificate by giving a group signature;

a reception terminal obtaining said active electronic certificate from said remittance terminal and verifying said group signature;

said verification server matching the certificate ID informed from said management server with the certificate ID included in said active electronic certificate to verify availability of said active electronic certificate;

designating a number of points for determining a value of said inactive electronic certificate;

setting said number of points to said inactive electronic certificate; and updating a remaining amount of points of a remitter based on said number of points, wherein at least one of the management server, the verification server, the remittance terminal, and the reception terminal is implemented using a computer.

* * * * *